United States Patent
Zwartenkot et al.

(10) Patent No.: US 8,954,941 B2
(45) Date of Patent: Feb. 10, 2015

(54) METHOD AND APPARATUS AND RECORD CARRIER

(75) Inventors: Hendrik Tjeerd Joannes Zwartenkot, Eindhoven (NL); Alexander Augusteijn, Eindhoven (NL); Yuanging Guo, Eindhoven (NL); Jürgen Von Oerthel, Eindhoven (NL); Jeroen Anton Johan Leijten, Hulsel (NL); Erwan Yann Maurice Le Thenaff, Eindhoven (NL)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 13/393,823

(22) PCT Filed: Sep. 3, 2010

(86) PCT No.: PCT/NL2010/050555
§ 371 (c)(1),
(2), (4) Date: Jun. 28, 2012

(87) PCT Pub. No.: WO2011/028116
PCT Pub. Date: Mar. 10, 2011

(65) Prior Publication Data
US 2012/0265972 A1 Oct. 18, 2012

Related U.S. Application Data

(60) Provisional application No. 61/240,059, filed on Sep. 4, 2009.

(51) Int. Cl.
G06F 9/45 (2006.01)
G06F 15/76 (2006.01)
G06F 9/30 (2006.01)

(52) U.S. Cl.
CPC ............ *G06F 9/3017* (2013.01); *G06F 8/4434* (2013.01); *G06F 9/30156* (2013.01); *G06F 9/30167* (2013.01); *G06F 9/30178* (2013.01)
USPC ............. 717/149; 712/24; 712/212; 712/224; 712/42

(58) Field of Classification Search
None
See application file for complete search history.

(56) References Cited

U.S. PATENT DOCUMENTS 5,901,301 A * 5/1999 Matsuo et al. ................ 712/212
6,151,618 A * 11/2000 Wahbe et al. ..................... 718/1

(Continued)

FOREIGN PATENT DOCUMENTS

WO WO 97/43710 11/1997

OTHER PUBLICATIONS

Lefurgy C et al: "Improving code density using compression techniques", Proceedings of the 30th Annual IEEE/ACM International Symposium on Microarchitecture, 1997, pp. 194-203.*

(Continued)

*Primary Examiner* — Don Wong
*Assistant Examiner* — Mohammad Kabir
(74) *Attorney, Agent, or Firm* — Blakely, Sokoloff, Taylor & Zafman LLP

(57) ABSTRACT

Method of generating respective instruction compaction schemes for subsets of instructions to be processed by a programmable processor, comprising the steps of a) receiving at least one input code sample representative for software to be executed on the programmable processor, the input code comprising a plurality of instructions defining a first set of instructions (S1), b) initializing a set of removed instructions as empty (S3), c) determining the most compact representation of the first set of instructions (S4) d) comparing the size of said most compact representation with a threshold value (S5), e) carrying out steps e1 to e3 if the size is larger than said threshold value, e1) determining which instruction of the first set of instructions has a highest coding cost (S6), e2) removing said instruction having the highest coding cost from the first set of instructions and (S7), e3) adding said instruction to the set of removed instructions (S8), f) repeating steps b-f, wherein the first set of instructions is formed by the set of removed instructions (S9, S10).

17 Claims, 12 Drawing Sheets

(56) References Cited

U.S. PATENT DOCUMENTS

| | | | |
|---|---|---|---|
| 6,195,743 B1* | 2/2001 | Elnozahy | 712/42 |
| 6,321,322 B1* | 11/2001 | Pechanek et al. | 712/24 |
| 8,108,844 B2* | 1/2012 | Crutchfield et al. | 717/149 |
| 2007/0162724 A1* | 7/2007 | Dytrych | 712/209 |
| 2007/0294680 A1* | 12/2007 | Papakipos et al. | 717/149 |
| 2008/0244245 A1* | 10/2008 | Lim et al. | 712/227 |
| 2009/0177876 A1* | 7/2009 | Wang et al. | 713/1 |
| 2009/0313460 A1* | 12/2009 | Huang et al. | 712/227 |

OTHER PUBLICATIONS

PCT Search Report, PCT/NL2010/050555, International Filing Date Sep. 3, 2010, Applicant Silicon Hive B.V., date of mailing Mar. 24, 2011.

Ryuka, Summary of "Notice of Reasons for Rejection", Patent Application No. 2012-527839, Nov. 26, 2013, 4 pages.

* cited by examiner

METHOD AND APPARATUS AND RECORD CARRIER

CROSS-REFERENCE TO RELATED APPLICATIONS

This patent application is a U.S. National Phase application under 35 U.S.C. §371 of International Application No. PCT/NL2010/050555, filed Sep. 3, 2010, entitled METHOD AND APPARATUS AND RECORD CARRIER, which claims priority to U.S. provisional patent application No. 61/240,059, filed Sep. 4, 2009.

BACKGROUND

1. Field of the Invention

The present invention relates to a method for generating a set of instruction compaction schemes.

The present invention further relates to a method for compacting a program according to the generated set of instruction compaction schemes.

The present invention further relates to an apparatus that is suitably programmed for carrying out these methods.

The present invention further relates to a record carrier that comprises a program for causing an apparatus to carry out one or more of these methods.

The present invention still further relates to a programmable processor that is capable of executing a program that is compacted as indicated above.

2. Related Art

US2002042909 describes a compiling method for generating a sequence of program instructions for use in a processing architecture with architecture resources executing instructions from a corresponding instruction set.

The known compiling method inputs a source file that comprises a plurality of source code instruction statements including at least a first kind of instruction statements and a second kind of instruction statements. The method selects at least a first instruction set and a second instruction set. The second instruction set is a compact instruction set designed to support only a subset of the architecture resources supported by the first instruction set. By using the at least two instruction sets of different sizes, the compiler is able to reduce the processed average code length, since fewer bits are needed in the compact code to encode operations and registers.

In the known method the compiler detects whether the type of source code is a time-critical code or an administrative code. The code classified as administrative is represented by the first, compact instruction set and the time-critical code is represented by the second instruction set. By using the at least two instruction sets of different sizes, the compiler is able to reduce the processed average code length, since fewer bits are needed in the compact code to encode operations and registers.

It is a disadvantage of the known compiler that an assignment of a first and a second instruction set is only possibly if time-critical code and administrative code can be discerned.

It is a purpose of the present invention to provide a method capable of generating one or more instruction sets also in more general circumstances.

SUMMARY

According to a first aspect of the invention a method is provided of generating respective instruction compaction schemes for subsets of instructions to be processed by a programmable processor, comprising the steps of a) receiving at least one input code sample representative for software to be executed on the programmable processor, the input code comprising a plurality of instructions defining a first set of instructions,
b) initializing a set of removed instructions as empty,
c) determining the most compact representation of the first set of instructions,
d) comparing the size of said most compact representation with a threshold value,
e) carrying out steps e1 to e3 if the size is larger than said threshold value,
e1) determining which instruction of the first set of instructions has a highest coding cost,
e2) removing said instruction having the highest coding cost from the first set of instructions and,
e3) adding said instruction to the set of removed instructions,
f) repeating steps b-f, wherein the first set of instructions is formed by the set of removed instructions.

Contrary to the known method, the method according to this first aspect is generally applicable. The method effectively groups instructions having a large mutual correspondence in a common group. Deviating instructions that have a high coding cost are selected to form a separate group. This process may be repeated.

For some instructions the most compact representation may be the original (uncompacted) representation. The original representation used here will also be denoted as the "full view".

The number of instruction compaction schemes and the required compression for each instruction compaction scheme may be fixed. Alternatively, a number of instruction compaction schemes and the compression per instruction compaction scheme may be determined automatically by a computation taking into account a number of different instructions in the plurality of instructions and a threshold value indicating the minimally required compression factor. In an embodiment a user is requested to specify a number of instruction compaction schemes and the compression per instruction compaction scheme so that the user can control the compaction process and try out which specification provides the best results.

In an embodiment of said method the instructions comprise a plurality of instruction fields that are individually compacted. By compacting individual instruction fields a higher compression is obtained than if the instructions are compacted as a whole. If two instructions have the same value in a particular instruction field, but differ otherwise, the value for that instruction field can be compacted by a common code, but a compaction of the instructions as a whole would require different codes. Knowledge about the instruction fields is preferably obtained from a processor description file. A compaction scheme may correspond to a certain view of the programmable processor. A processor view is defined as a target for the Silicon Hive compiler where only a subset of the processor's resources is available for use. Knowledge about the processor's resources is obtained from the processor description file.

In a variant of said embodiment the instruction fields that are individually compacted comprise at least an opcode, a field indicative for an index to a write-port, and a field indicative for an index to a read-port. Compacting these fields results in a high code size reduction. In addition the following fields may be compacted individually: a field indicative for a result port (bus), a field indicative for a write-port-select, and, a field comprising an immediate value.

In an embodiment the instruction compaction schemes for the different subsets have a mutually different codeword width, at least one of the subsets having a minimum codeword width. In case the subsets are allowed to have a mutually different size, some subsets may be compacted using a smaller codeword, therewith saving coding space. Some subsets may have mutually different compaction schemes, but be encoded by codewords having mutually the same size.

In an embodiment the size of the codewords of the compaction scheme for each subset is an integer number greater or equal than 1 times the minimum codeword width. The reading of instructions is simplified by this measure. Part of the instructions may be left uncompacted. The length of these instructions may be equal to the width of the instruction memory from which the instructions compacted or not-compacted are fetched, but may alternatively be smaller. Preferably the instructions are not larger than the width of the instruction memory to keep short instruction fetch times.

In an embodiment mutually different subsets are compacted in mutually different ways. For example, instruction that are compacted according to a first view may use table lookup decompaction (expansion) using compile time programmable registers and instructions compacted according to a second view may use table lookup using hardwired lookup tables. It is advantageous if at least one of the subsets is compacted as a variable length code. By applying a variable length code (VLC) for only a subset of the instructions on the one hand the advantage is obtained of a high compression factor for the instructions in that subset, while on the other hand the amount of codes remains modest, so that the codes within this subset can be easily decompacted (expanded). The only restriction for the compaction scheme is that the compacted instructions within the same view have a size smaller or equal to a certain maximum length. Hence, VLC compacted instructions with a length smaller or equal to the 'view' length would fit in this view.

According to a second aspect of the present invention the method according to the first aspect further comprises the steps of receiving a program comprising a plurality of instructions,
    for each instruction determining the corresponding instruction compaction scheme as determined in steps a-f,
    compressing the instruction according to said instruction compaction scheme,
    providing the compacted instructions.

The program that is compacted in this way may be the same program that was used to define the set of instruction compaction schemes.

The compacted instructions may be sorted into specific address ranges, so that it is clear from the address of an instruction what type of compaction scheme is used.

In an embodiment the method according to this second aspect further comprises the step of providing the compacted instructions together with at least one indicator for indicating the type of compaction scheme used. This makes it possible to store the compacted instructions in the same sequence as in the original program which facilitates processing. Furthermore the compacted instructions need not be aligned.

In an embodiment the compacted instructions are stored in words comprising a plurality of segments, and each segment comprises at least an indicator that indicates whether said segment is the first segment of a compacted instruction.

In another embodiment the compacted instructions are stored in words comprising a plurality of segments, where each compacted instruction comprises an indicator at a predetermined location within said compacted instruction, the indicator indicating the view of the next compacted instruction. This has the advantage that even if instructions according to different views have different sizes, the instruction expander that decompacts the compacted instructions can correctly and timely prefetch the next codeword for the compacted instruction.

According to a third aspect of the invention an apparatus is provided that is suitably programmed for carrying out a method according to the first or the second aspect.

According to a fourth aspect of the invention a record carrier is provided comprising a program for causing an apparatus to carry out the method according to the first or the second aspect.

According to a fifth aspect of the invention a programmable processor is provided that comprises:

a program memory comprising a sequence of instructions that are stored as compacted instruction data, the compacted instruction data at least comprising first instructions compacted according to a first compaction scheme as first code words of N memory word segments and second instructions compacted according to a second compaction scheme as second code words of M memory word segments,
    an instruction decoder,
    at least one register file,
    at least one issue slot coupled to the register file,
    an instruction expander comprising
        a compaction scheme identifier for identifying the instruction compaction scheme for compacted instruction data fetched from the program memory,
        an input for receiving a program counter,
        a storage facility for temporarily storing at least a segment of a program memory word,
        a selection facility for selecting compacted instruction data from the program memory and the storage facility,
        an instruction expanding unit for expanding the selected compacted instruction to expanded instructions of size K,
        a control facility for generating an address for the program memory in response to the program counter, and for controlling the selection facility, wherein K, N, M are integers greater or equal than 1, the integers N, M being not greater than K, and wherein at least one of N, M is less than K.

The first to the fifth aspect of the invention are part of an environment that may further comprise design and test facilities.

BRIEF DESCRIPTION OF THE DRAWINGS

These and other aspects of the invention are described in more detail below. Therein

DETAILED DESCRIPTION OF EMBODIMENTS

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components, and/or sections, these elements, components, and/or sections should not be limited by these terms. These terms are only used to distinguish one element, component or section from another element, component, and/or section. Thus, a first element, component, and/or section discussed below could be termed a second element, component, and/or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

Figure 1:
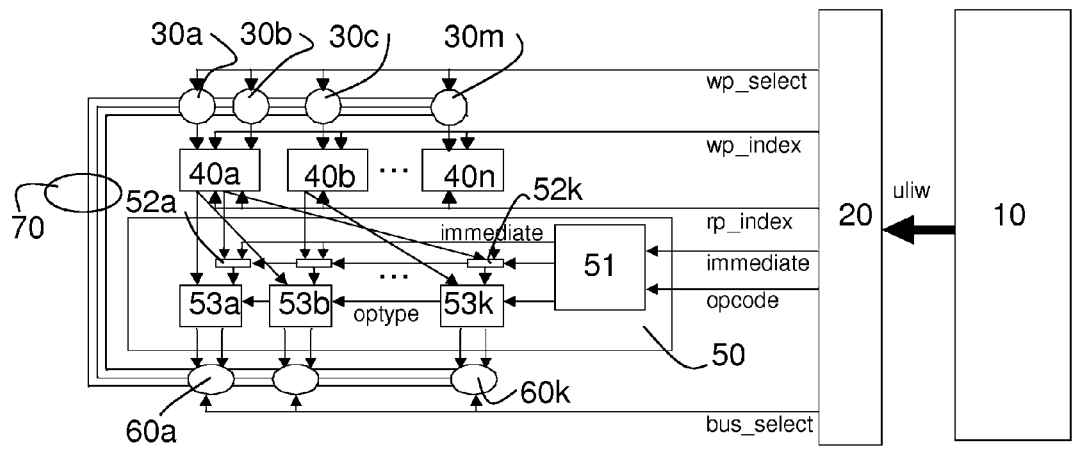
FIG. 1 shows a conventional programmable processor.

FIG. 1 schematically shows a programmable processor. In the example shown in FIG. 1, the programmable processor is a VLIW-processor. The VLIW processor processes a plurality of instruction words in parallel that are grouped in a VLIW instruction word. These are usually produced by the software development tools. The VLIW-processor shown in FIG. 1 comprises a program memory 10 and an instruction decoder 20 coupled to the program memory. The program memory 10 contains the VLIW instruction words. The VLIW-processor further comprises a plurality of register files 40a, . . . , 40n that are coupled to a plurality of busses 70 via first selection elements 30a, . . . , 30m. A register file has one or more input ports and one or more output ports. A register port consists of a data input or output and an address input.

For clarity, FIG. 1 only shows a single issue slot 50. In practice the VLIW processor will have a plurality of issue slots. Each of the plurality of issue slots handles a particular instruction word from the VLIW instruction word. An issue slot contains one or more functional units that can perform a limited set of operations on the input data. The issue slot 50 has an instruction decoder 51, and a plurality of functional units FU, 53a, . . . , 53k, e.g. a multiplier, an adder, a shifter etc. The issue slot 50 further has second selection elements 52a, . . . , 52k that select input data from various sources, e.g. a register file and an output from the decoder 20 providing an immediate value. The operation of the functional units 53a, . . . , 53k and the second selection elements 52a, . . . , 52k is controlled by the operation decoder 51. The processor further comprises a plurality of third selection elements 60a, . . . , 60k that selectively couple the functional units 53a, . . . , 53k to the bus 70.

The instructions usually comprise a plurality of instruction fields. Each field controls a specific item of the datapath of the programmable processor. In this particular example the instructions may comprise the following 6 instruction fields for the opcode, the selection of the result port select (bus_select), the selection of the write port (wp_select), the specification of the index of the write port (wp_index), the selection of the index of the read port (rp_index) and the specification of an immediate.

Usually each issue slot has one opcode instruction field. This field selects which operation is to be executed by that issue slot. The operation is executed by one of the issue slot's functional units. The opcode is decoded into a functional unit select signal and an operation type (optype) to activate a specific FU and a specific operation of that FU. In some cases an opcode may be absent, for example if the issue slot is specialized in handling only one operation, e.g. loading an immediate value.

Each bus having more than one issue slot output has a separate bus_select field to indicate which issue slot output is connected to a bus.

Each register file input port is connected to one or more busses. If there is more than one bus connected to one writeport, a multiplexer selects the correct bus to the input port of the register file. The writeport select (wp_sel) instruction field contains the select value for this multiplexer. A special code wp_sel="11 . . . 11" is used to indicate that no write action should take place on the writeport.

This instruction field contains the address of the register that is written to in the register file. Each register writeport has a separate wp_index.

This instruction field contains the address of the register that is read from the register file. Each register readport has a separate rp_index.

The immediate instruction field contains a value that can be used as input for one of the functional units in an issue slot.

A way of code compaction not according to the present invention, referred to as immediate overlaying, relies on the fact that an input of a functional unit in an issue slot can use either a register file output or an immediate field as input. The optype determines what the input is and this can differ per instruction. If the opcode indicates that the register file output is used for an operation then the immediate field for that issue slot is redundant. Consequently, if the immediate value is selected as input, then the register index field for the register output port connected to the input of the issue slots is redundant. Because this immediate field and this register index field are never used within the same instruction, the two fields can be combined. This combining of (parts of) immediate and register index fields will be referred to as immediate overlaying.

Another way of code compaction exploits the use of different views. A processor view is defined as a target for a compiler where only a subset of the processor's resources are available for use. The subset can be defined by restricting:

Register file properties: number of input/output ports, address range

Functional unit properties: immediate range, number of opcodes.

number of busses complete issue slots, functional units, register files, . . . etc.

In terms of code compaction, a processor view is useful if the number of instruction bits to control the subset is significantly less than the number of instruction bits for the complete processor. A processor can have more than one view.

Figure 2:
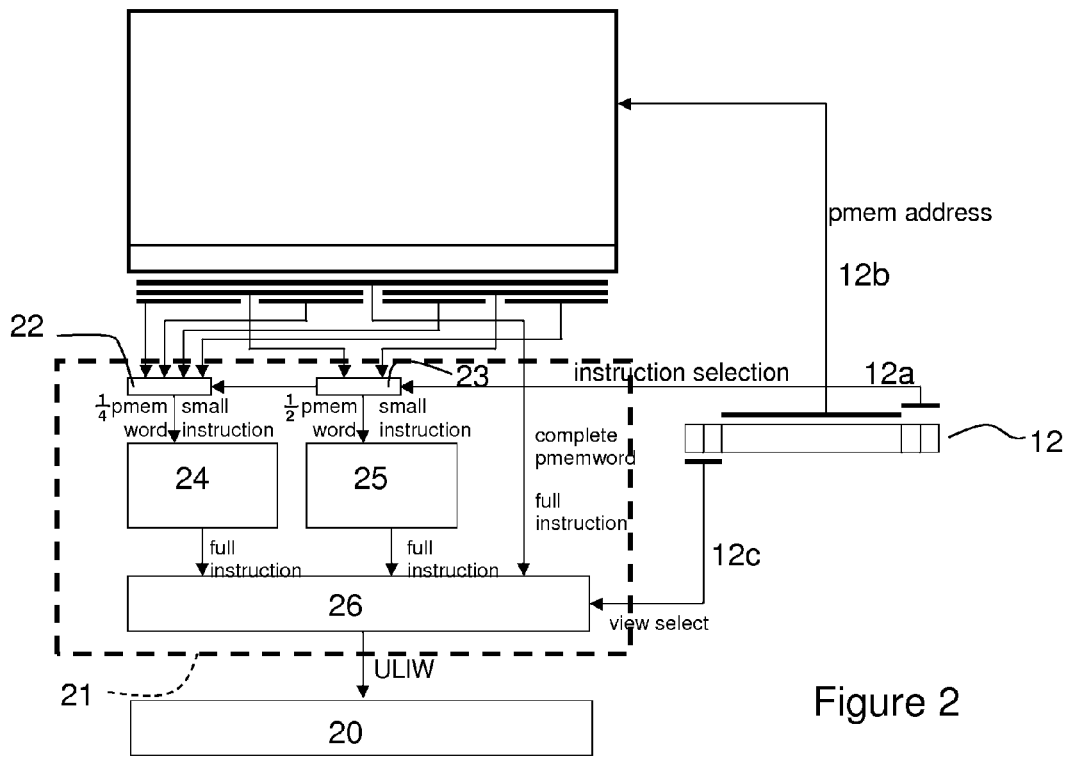
FIG. 2 shows a part of another conventional programmable processor, FIG. 3 schematically shows a content of a program memory of the processor shown partly in FIG. 2.

The hardware for supporting the view mechanism is shown in FIG. 2. In a first view (view 0) all resources of the processor are available. Program memory words comprise a single instruction. In a second view (view 1) each program memory word comprises 2 compacted instructions. In a third view (view 2) each program memory word comprises 4 compacted instructions, as is shown schematically in FIG. 3.

Note that the full view does not necessarily equal the program memory width. It sometimes makes sense to choose a wider program memory in order to enable a better compression for a smaller view. For example, suppose a processor has a full width of 60 bits and the smallest view has a width of 16 bits. By taking a program memory width of 60, the smallest view has a compression of 60/16=3.75. This has to be rounded down to the first power of 2, which results in a compression factor of 2. If the width of the program memory equals 64, then the compression becomes a factor 4.

Figure 3:
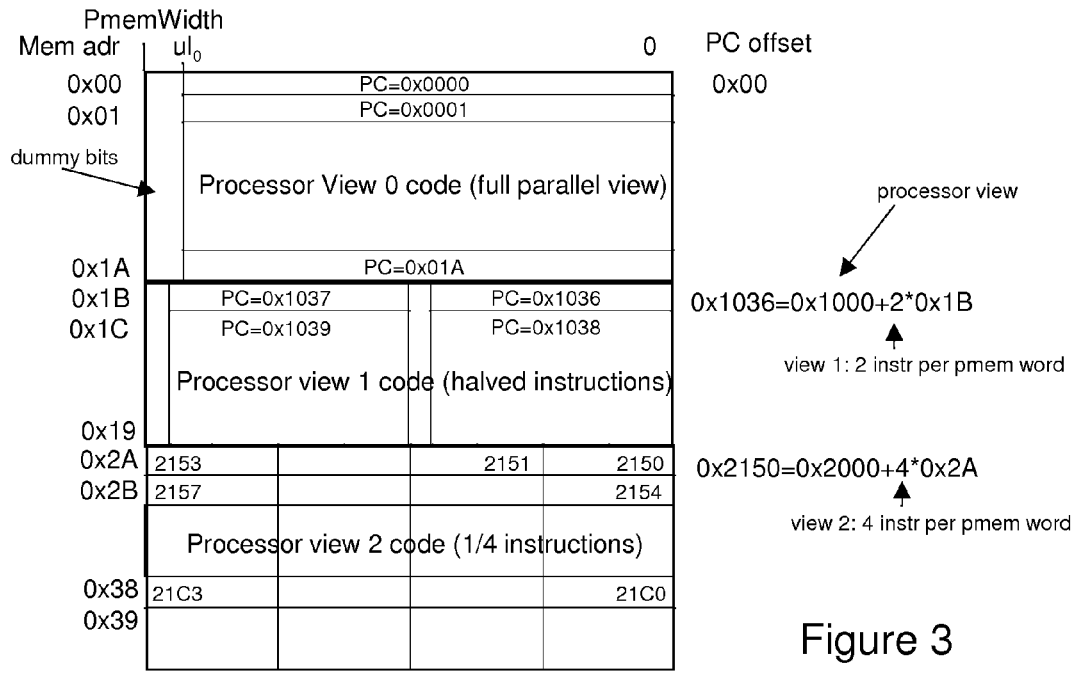

In FIG. 3 the instructions for view 0 are placed in the normal way, starting at address 0. For the view 0 instructions, the PC equals the program memory address. The instructions for view 1 start at program memory address 0x1B. The program counter for the first instruction of view 1 is formed by one LSB with value 0 indicating that the lower half of program memory word 0x1B contains the instruction, two MSB's with the value "01" indicating that the instruction is a view 1 instruction and the middle bits with that equal the program memory address 0x1B. The result is 0x1036 for the PC. The PC values for subsequent instructions can be found by incrementing the PC. Starting from address 0x2A, the instructions for view 2 are placed. The PC value for the first view 2 instruction is formed by 2 lsb's with the value "00" to select the first out of 4 compacted instructions in the word, the memory address: "0x2A" and the 2 MSB's with value 2, representing the view number. The result is 0x2150.

As shown in FIG. 2, the hardware for supporting the view mechanism comprises a first and a second compacted instruction selector 22, 23, a first and a second instruction decompaction unit 24, 25 and a full instruction selector 26. When running a program, the processor indicates the instruction to be executed with its program counter (PC) 12. The output of the program counter 12 has a first portion 12a that controls the first and the second instruction decompaction units 24, 25, a second portion 12b that addresses the required program memory word and a third portion 12c that controls full instruction selector 26. Portion 12c indicates the view selection. In full view mode, the PC equals the program memory address. A program memory word for the full view (view 0) contains exactly one full instruction. The full instruction selector 26 merely passes this instruction to the instruction decoder 20.

In 'compacted view' mode, the PC cannot directly be mapped onto the program memory address. In that case part 12a of the PC indicates which instruction in the program memory word needs to be selected. If the program memory word indicated by the address in portion 12b is read, the compacted instruction selected by the first and a second compacted instruction selector 22, 23 controlled by portion 12a of the program counter is extracted in the instruction decompaction units 24, 25.

The instruction decompaction units 24, 25 translate a compacted instruction into a full instruction.

For each implemented compaction scheme, corresponding to a particular view of the processor, an instruction decompactor 24, 25 is implemented. The outputs of the decompactors 24, 25 are input of the full instruction selector 26. The portion 12c of the PC (view_select) determines which of the inputs of the full instruction selector 26 is selected as the output of the instruction selector 26.

In the code compaction method as described with reference to FIGS. 2 and 3, the programmer defines what code needs to be run in what view. All instructions of a basic building block should target one view. Switching of views is only possible by means of a jump operation. This is only accomplished by a jump instruction. After instruction selection and scheduling, the assembler defines the compacted instructions and determines how multiple compacted instructions are placed in one program memory word. The linker defines the program memory address for each constructed word. Generally, the instructions for one view are grouped together. The first instruction of a group starts always at bit 0 of a program memory word. Subsequent instructions within the same basic building block are placed subsequently within a program memory word, leaving dummy bits in between them if the compacted instruction size multiplied with the compression factor is smaller than the program memory width. If the word is full, the next instruction is placed at bit zero of the next program memory word.

Figure 4:
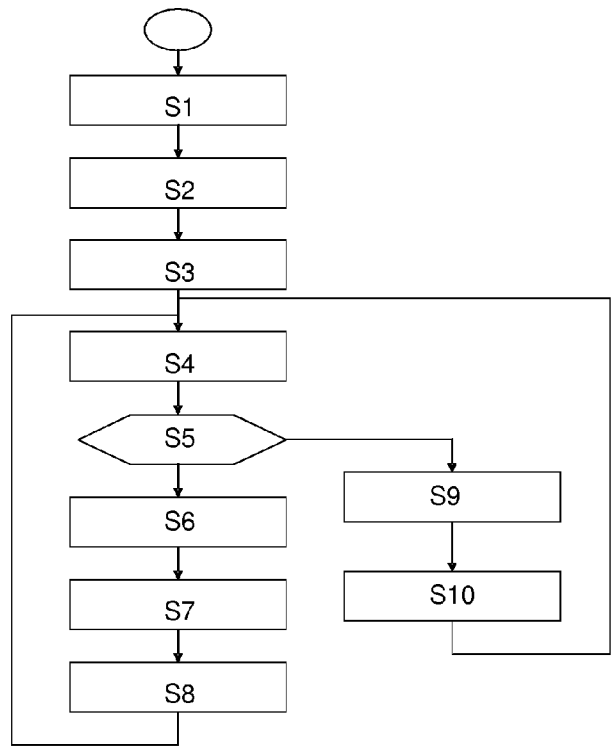
FIG. 4 shows a method of determining a set of instruction compaction schemes.

FIG. 4 schematically shows a method according to the present invention of generating respective instruction compaction schemes for subsets of instructions to be processed by the programmable processor. The method comprises a first step S1 of receiving at least one input code sample representative for software to be executed on the programmable processor, the input code comprising a plurality of instructions defining a first set of instructions (S1).

In the embodiment shown, the method comprises a second step S2, wherein a user is requested to specify a number of instruction compaction schemes as well as the minimally required compression for each instruction compaction scheme. In this way the user can control the compaction process and try out which specification provides the best results. Step S2 is not essential. Alternatively the number of instruction compaction schemes and the required compression per instruction compaction scheme may be fixed. In again another embodiment a number of instruction compaction schemes and the compression per instruction compaction scheme may be determined automatically by a computation taking into account a number of different instructions in the plurality of instructions and a threshold value.

In a third step (S3) a set of removed instructions is defined, and this set of removed instructions is initialized as an empty set.

Then in step S4 the most compact representation of the first set of instructions is determined.

In step S5 the size of said most compact representation is compared with a threshold value. Depending on the result of this comparison, either steps S6 to S8 are performed or steps S9 to S10 are performed after step S5. If the size of the most compact representation is greater than said threshold value S6 to S8 are performed, otherwise steps S9 to S10 are performed.

In step S6 it is determined which instruction of the first set of instructions has a highest coding cost. Subsequently in step S7 that instruction is removed from the first set of instructions and is step S8 added to the set of removed instructions. Program flow then continues with step S4.

In case that it was determined that the size of the most compact representation is not greater than said threshold the first set of instructions is redefined as the set of removed instructions (Step S9) and the set of removed instructions is redefined as empty (Step S10).

Figure 5:
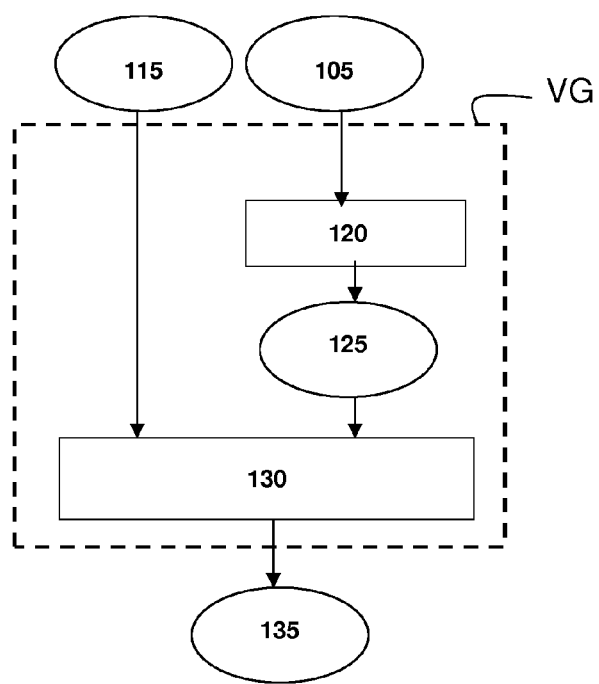
FIG. 5 illustrates a tool for generating a set of instruction compaction schemes.

The method according to the first aspect of the present invention may be used in a view generation tool VG as shown in FIG. 5. As shown therein the view generation tool starts with a view independent relocatable object file 115, e.g. in ELF (execution language format). The view independent relocatable object file 115 can be obtained from a typical software application that has to be executed by the processor. The relocatable object file 115 ideally fits exactly in the chosen program memory after compression. The object file 115 is the result of a linking step wherein all modules required for the program are merged. The file 115 contains symbols for jump targets and for data objects. The view generation tool VG should handle symbols as individual values. Although this may not be true, it should assume that two different symbols always refer to different values. In an embodiment, the view generation tool VG can do a pre relocation in order to identify symbols with the same value. Potentially this reduces the number of entries for a table and thus improves the compression factor.

In the embodiment shown additionally a processor description file 105 is provided. The processor description file 105 facilitates in reducing the search space for searching for an optimal set of instruction compaction schemes, as it provides information about how the instructions can be partitioned in instruction fields that can be separately compacted. The processor description file 105 of the processor is converted into a time stationary instruction format (TSIF) datastructure 125 by a first Architecture Parameter Extraction (APEX) module 120. The APEX module 120 provides an Application Programmers Interface (API) for extracting the parameters defined in the hardware description of the processor. This API is used when building the hardware for the processor, using the hardware building blocks libraries. The TSIF datastructure 125 and the view independent relocatable object file 115 are provided to a view generation module 130, which will be described in more detail below. The view generation module 130 generates a view definition file 135.

A typical implementation of an embodiment of the view generation module 130 is shown in a pseudo code below. In this embodiment the set of instruction compaction schemes is determined solely from the relocatable object file 115.

```
minimal_view(instructions)    // returns the minimal view for the given
                              instructions
size(view)                    // returns the size of view in number of
                              instruction bits
Instructions = all program instructions
RemovedInstructions = empty   // set of removed instructions
view[ ]  // array of views
goal_view_size[ ]  // indicates the desired size of each view
for v in all_views {
    view[v] = minimal_view(Instructions)
    while (size(view[v]) < goal_view_size[v]) {
        remove_instr = find_most_expensive(Instructions)
        Instructions = remove_one(Instructions, remove_instr)
        RemovedInstructions = add_one(RemovedInstructions,
remove_instr)
        view[v] = minimal_view(Instructions)
    }
    Instructions = RemovedInstructions
}
```

The view definition file 135 preferably comprises the following information.

Number of views
Number of instruction fields
Full instruction width (number of bits)
Per instruction field
    width (number of bits)
Per view
    instruction width (number of bits)
    per instruction field
        width (number of bits)
        bit indices of the slice in the compacted instruction
        implement table (yes/no)
        if yes, table size (number of entries)
        NOP value (registers can be saved by making the NOP value Read- Only)

The view generation tool VG shown in FIG. 5 defines views for a programmable processor, such that a high compression factor is reached for representative programs that are intended to run on this programmable processor. The hardware for decompaction should be 'affordable', i.e. not be excessive in gate count and/or timing figures.

The view generation tool generates a set of instruction compaction schemes. In the following description it is presumed that each instruction compaction scheme corresponds to a particular view of the processor. Alternatively, instruction compaction schemes may be determined independent from the views of the processor.

The tool VG generates the views using a software kernel 115 provided by the user. This software kernel is supposed to be representative for the (future) use of the processor. It should be sufficiently large and it should address all aspects of the processor. For example, if the processor contains custom operations, it is recommended to provide a kernel that actually uses these custom operations. The user can tweak the view generation process by indicating the number of views and the compression per view. The view generation tool VG aims at generating the optimal views for the processor running the supplied software kernel. An optimal view is considered the view that provides for the highest compression factor. The kernel should be supplied as a single file, e.g. in ELF (execution language format) with symbols for the jump targets.

The tool VG reads all instructions and stores each individual instruction field. It then determines the so called minimal view. This minimal view is defined as the smallest view where all instructions of the program can run in. Usually, the width of the minimal view is smaller than the width of the original full view. The minimal view consists of a table for each instruction field with a certain number of entries. The log$_2$ number of entries equals the compacted width for that instruction field. The sum of the compacted instruction field widths equals the compacted instruction width. Now the user can set a constraint on the size of a view by defining a compression factor. The aim of the view generation tool VG is to define the optimal view given this compression factor and a set of instructions. The optimal view is defined as that view on which the maximum number of instructions from the supplied set can be mapped.

After the creation of the minimal view, one instruction out of the supplied set is removed and the minimal view is recreated. Then a next instruction is removed and again the minimal view is recreated. The removal of an instruction may result in a smaller minimal view. The process of removing an instruction and recalculating the minimal view continues until the minimal view size has reached the goal indicated by the user. Then a next view can be generated starting with the instructions that do not fit on the first view. The main question in this process is: "Which instruction is candidate for removal?"

This question can be answered by calculating cost criteria for each instruction and selecting the one with the highest cost for removal. As the aim of the algorithm is to decrease the number of bits of the minimal view, the cost is expressed in a number of bits as well. The amount of bits required for the minimal view is the result of all instructions that fit on this view. These instructions have different instruction field values that lead to different entries in the tables. The amount of different entries in the tables defines the number of bits. Now depending on the instruction fields of an instruction, in relation to the instruction fields of all other instructions, an instruction costs more or less.

By definition, the cost of all instructions equals the amount of bits required for the minimal view. The cost of a single instruction equals the sum of the costs of its instruction fields. The cost of an instruction field is dependent on the frequency of the instruction field's value considered over the field values in all instructions. If the field value is rare (frequency low), the cost is high because the table entry for this field is used by less instructions. If the field value is common (frequency high), the cost is low because much other instructions use the same table entry. The cost of one table entry in the two cases is equal but with the common value, the cost is shared with many instructions whereas in the rare value case, the cost is shared with a low amount of instructions so per instruction the cost is higher.

By definition, the cost of one instruction field over all instructions equals the instruction fields' width. If the cost of one instruction field value is made dependent on the reciproke of the frequency, it has to be compensated with a multiplication factor that is constant for one instruction field over all instructions.

In formula form:
ND$_{if}$—Number of different values for an instruction field if over all instructions.
f$_{ifv}$—Frequency of an instruction field value ifv over all instructions.
b$_{if}$—Number of bits for instruction field if.
cost$_{ifv}$—Cost of instruction field value ifv.

$$Cost_{ifv} = \frac{b_{if}}{f_{ifv} \cdot ND_{if}}$$

The instruction field value cost function is explained in an example in the following tables 1A, 1B.

TABLE 1A instruction field value cost

| | | value cost | |
|---|---|---|---|
| Instr__nr | Instr__fld__vl | cost | freq1 |
| 0 | 0 | 0.15 | 5 |
| 1 | 1 | 0.75 | 1 |
| 2 | 0 | 0.15 | 5 |
| 3 | 5 | 0.375 | 2 |
| 4 | 0 | 0.15 | 5 |
| 5 | 2 | 0.25 | 3 |
| 6 | 5 | 0.375 | 2 |
| 7 | 0 | 0.15 | 5 |
| 8 | 2 | 0.25 | 3 |
| 9 | 2 | 0.25 | 3 |
| 10 | 0 | 0.15 | 5 |
| total instruction field cost | | 3 | |

TABLE 1B instruction field

| table entries | freq2 |
|---|---|
| 0 | 5 |
| 1 | 1 |
| 2 | 3 |
| 3 | 0 |
| 4 | 0 |
| 5 | 2 |
| 6 | 0 |
| 7 | 0 |

The example is based on a small program consisting of 11 instructions (instr_nr). The first table 1A shows the instruction field values for the 11 instructions. The second table 1B indicates which instruction field values (instr_fld_vl) indicated in the column table entries are to be stored in the table. The second table also shows the frequencies (freq2) of the instruction field values, i.e. how often the entry is used in the program. The frequency column (freq1) in the first table is the result of a lookup of the frequency (freq2) for the instruction field value (instr_fld_vl) in the column "table entries" in the second table. With the frequency (freq2), the number of different entries and the field width, the cost for each instruction field can be calculated, as shown in the column "cost" of the first table. In this case the number of different entries ND that occur at least once is 4. The field width, i.e. the number of bits for the field is 3, as there are 8 possible instruction field values. The bottom row of the first table shows the summation of all the instruction field costs. By definition this equals the field width.

As expected the instruction field values with a low frequency contribute more to the cost than the values with high frequencies. The tables also show that each table entry costs the same. Table entry 5 occurs twice, in instruction 3 and in instruction 6. For both the cost equals 0.375 so the entry cost equals 2*0.375=0.75. Table entry 2 occurs three times, in instructions 5, 8 and 9. Per instruction, the cost is 0.25 so the entry costs 3*0.25=0.75, the same as for entry 5.

According to the present invention the view selection does not take place on a basic block level, but on instruction level. Accordingly, a next view may be selected for each instruction separately. With the introduction of instruction based view selection, the search space for generation of views becomes much wider. Where previously the programmer should have a clear idea on what to program on which view, now the programmer is not bothered with views anymore. This relieves the processor designer from the task of generating 'logical' views. Instead, the generation of views can be performed automatically by a method according to the first aspect of the invention.

Figure 6:
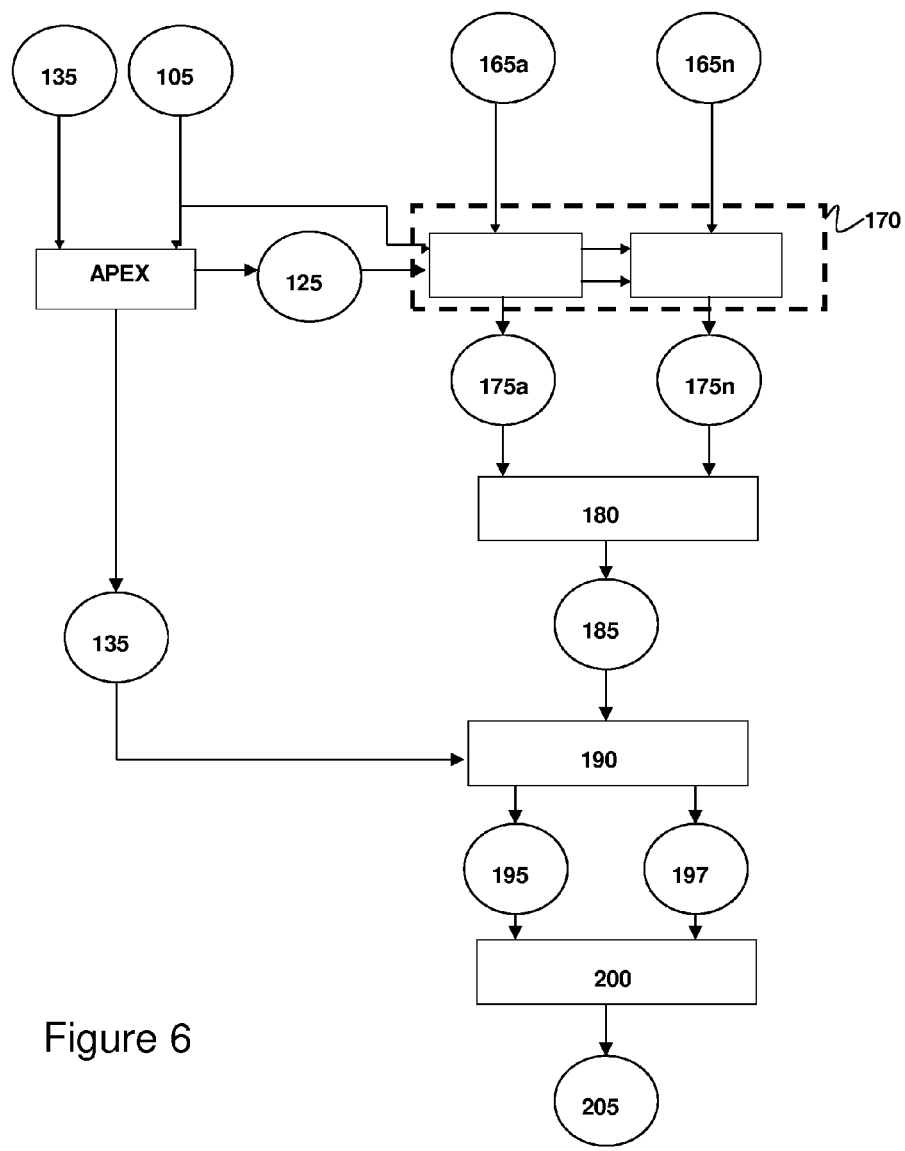
FIG. 6 illustrates a tool for compacting a program, FIG. 7 schematically shows a first embodiment of a programmable processor according to the present invention.

Having generated the set of instruction compaction schemes, a program for the programmable processor can be compacted as shown in FIG. 6.

Usually a program is formed out of more than one module. Per module, an assembly (.s) file 165a, . . . , 165n is generated by the scheduler. These assembly files are converted into relocatable object files 175a, . . . , 175n, in ELF format by the assembler 170. The assembler 170 requires a processor description 105 and the APEX TSIF data structure 125 for defining the instruction field values of the instructions. The output of the assembler 170 contains fixed values for all instruction fields, except for immediate fields. Immediate fields may contain fixed values as well as symbols. These symbols can refer to branch targets or to data objects.

The linker 180 merges the relocatable object files 175a, . . . , 175n generated by the assembler into one relocatable object file 185. The relocatable symbols for the immediate fields remain symbols, only the definition of the symbols may be adapted.

The compaction tool 190 converts the uncompacted program in the form of the relocatable object file 185 into a compacted program. The uncompacted program 185 enters the compaction tool 190 in the form an ELF relocatable object file. The tool compaction 190 acquires the view definitions and the full instruction format through APEX. APEX gathers the information from the processor description file 105 and forms the view description file. Like the view generation tool VG, the compaction tool 190 should handle the relocatable symbols as individual values. In an embodiment it is presumed that mutually different symbols always refer to mutually different values. In a preferred embodiment, the compaction tool 190 applies a pre relocation in order to identify symbols with the same value. Generally, this will improve the compression factor for a program.

While compacting the program, the compaction tool 190 places the symbols in the table as if they were normal values. The tool 190 should support this. The compaction process ends with two results:
1. A compacted program 195 containing a view id and a (compacted) instruction value per instruction.
2. The view table contents 197 for the program.

The view table 197 may contain relocatable symbols, the compacted program 195 not.

The compacted program 195 is placed in the program memory map. Examples thereof are given in the sequel. The result should be converted into an ELF object file. The view table contents should also be placed in this object file.

The linker 200 performs the relocation of the symbols in the table contents and transfers the object file into a binary representation 205.

In order to facilitate the programmable processor to identify the view according to which instructions are compacted, the compacted instruction data preferably comprises view identification data. Two examples are described below.

In a first embodiment extra bits are added to each segment of a program memory word. A segment has the size of the smallest view. The number of bits to be added depends on the number of views with the same size. One bit (S) indicates whether the segment is the start (S=1) of an instruction or not.

The length of the compacted instruction can be determined on the basis of these start bits of a sequence of segments. If multiple views having the same size are used for compaction of the software, extra bits can be added to identify the correct view id. Suppose that a processor has a smallest view with a size of ⅛ the full view size and that maximum two views have the same size. Then two bits need to be added per segment. The total required number of program memory bits equals PMsize*8*2=16*PMsize, wherein PMsize is the number of memory words in the program memory. As the view information is now available in the instruction, the program counter no longer needs to include the view information. Instead, the program counter equals the start segment address in the program memory.

This is illustrated with reference to the following tables. In the example shown therein the smallest view has a compression factor of ¼ and maximum two views have the same size. Also here two bits S,V are added per segment. Table 2 shows instruction information for a part of a sequence of 11 instructions. The first column shows the location of the instruction in the sequence, the second column shows the view corresponding to the instruction, the third column shows the length of the instruction, and the fourth column shows the view bit. In this example, the processor facilitates 6 views (0, . . . , 5), including the full view. Views 3 and 4 both have the same length (3 segments) and also views 1 and 5 have the same length (1 segment). The length of an instruction can be derived from the start segment bits, for views 0 and 2, the length directly determines the view. For views 1, 3, 4 and 5 next to the length, the view bit is required to determine the view.

TABLE 2

| Instruction information | | | |
| --- | --- | --- | --- |
| instr | view | length | view bit |
| 0 | 1 | 1 | 0 |
| 1 | 3 | 3 | 0 |
| 2 | 4 | 3 | 1 |
| 3 | 2 | 2 | 0 |
| 4 | 5 | 1 | 1 |
| 9 | 0 | 4 | 0 |
| 10 | 0 | 4 | 0 |

Table 3 shows how the instructions may be arranged in program memory. Each segment has a start segment bit S that indicates whether the segment is the start of a new instruction (1) or whether it contains a part of an instruction that has its start at a previous segment. Next to the start segment bit, each segment has a view bit V that indicates the instruction's view in case the instruction length did not already supply this information. Note that the view bit is only required for start segments. For instructions longer than one segment, the view information could be divided over the view bits of each segment. This can be useful if more than two views have the same length.

TABLE 3

| Program memory map | | | | | | | | | | | | |
| --- | --- | --- | --- | --- | --- | --- | --- | --- | --- | --- | --- | --- |
| | segm 3 | | | segm 2 | | | segm 1 | | | segm 0 | | |
| adr | ID | V | S | ID | V | S | ID | V | S | ID | V | S |
| 0 | 1 | 0 | 0 | 1 | 0 | 0 | 1 | 0 | 1 | 0 | 0 | 1 |
| 1 | 3 | 0 | 1 | 2 | 1 | 0 | 2 | 1 | 0 | 2 | 1 | 1 |
| 2 | ... | ... | ... | ... | ... | ... | 4 | 1 | 1 | 3 | 0 | 0 |
| ... | ... | ... | ... | ... | ... | ... | ... | ... | ... | ... | ... | ... |

TABLE 3-continued

| | Program memory map | | | | | | | | | | |
|---|---|---|---|---|---|---|---|---|---|---|---|
| | segm 3 | | | segm 2 | | | segm 1 | | | segm 0 | | |
| adr | ID | V | S | ID | V | S | ID | V | S | ID | V | S |
| 7 | 9 | 0 | 0 | 9 | 0 | 0 | 9 | 0 | 0 | 9 | 0 | 1 |
| 8 | 10 | 0 | 0 | 10 | 0 | 0 | 10 | 0 | 0 | 10 | 0 | 1 |

Figure 7:
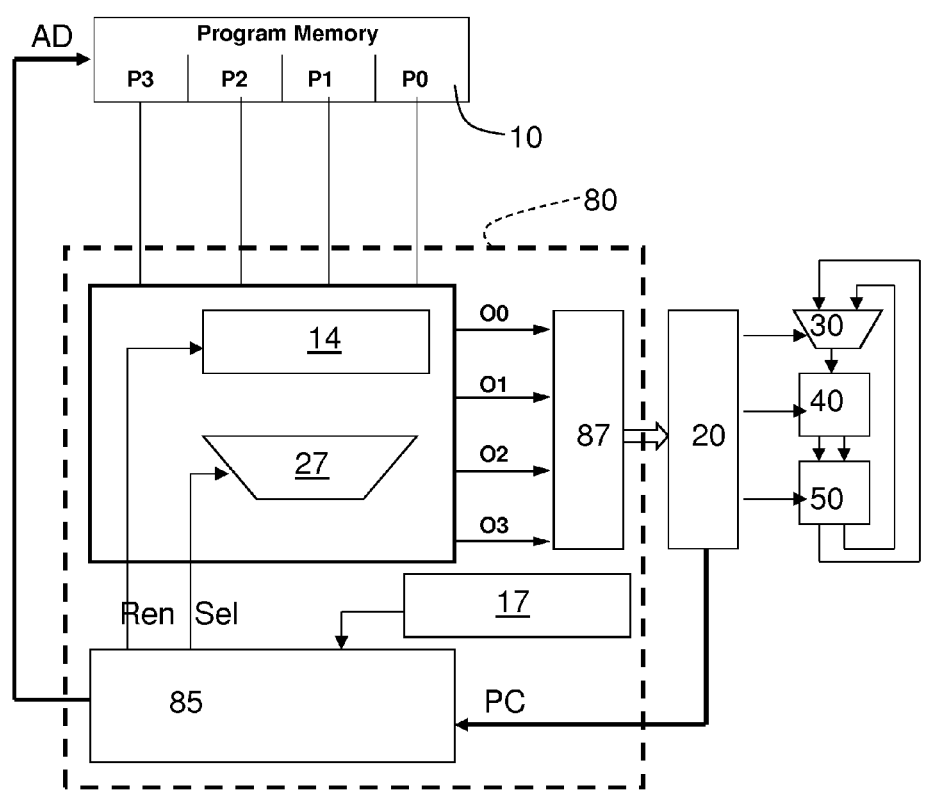

FIG. 7 schematically shows a programmable processor according to the present invention. The programmable processor shown therein comprises a program memory 10 storing the sequence of instructions as indicated above. The compacted instruction data at least comprises first instructions compacted according to a first instruction compaction scheme as first code words of N memory word segments and second instructions compacted according to a second instruction compression scheme as second code words of M memory word segments, wherein N and M are mutually different integers greater or equal than 1. In this case the compacted instruction data comprises instructions that are compacted according to six different formats.

The programmable processor further comprises an instruction decoder 20, at least one register file 40, and at least one issue slot 50 coupled to the register file 40. Additionally the programmable processor comprises a data selection element 30. The data selection element 30, the register file 40 and the at least one issue slot 50 are controlled by the instruction decoder 20. The programmable processor may comprise more issue slots, and each issue slot may comprise a plurality of functional units. Additional data handling elements, like storage elements, processing elements and selection elements may be present.

The programmable processor further comprises an instruction expander 80. The instruction expander 80 comprises a compaction scheme identifier 17 that identifies which instruction compaction scheme is used for each compacted instruction data fetched from the program memory 10. The instruction expander 80 has an input for receiving a program counter PC that is generated by the instruction decoder 20. The programmable processor further comprises a storage facility 14 for temporarily storing at least a segment of a program memory word and a selection facility (multiplexer unit) 27 for selecting compacted instruction data from the program memory 10 and the storage facility 14. The selected compacted instruction is expanded by an instruction expanding unit 87. The instruction expander 80 further comprises a control facility 85 for generating an address AD for the program memory 10 in response to the program counter PC. The control facility 85 further controls the selection facility 27 with signal Sel and the storage facility 14 with a read enable signal Ren.

In a programmable processor according to the present invention preferably any (compacted) instruction for each of the views can start at any segment in a memory word. This is realized by the storage element 14 arranged between the program memory and the instruction expanding unit 87. In this way instructions are supported that are stored over two sequential memory words.

Figure 8:
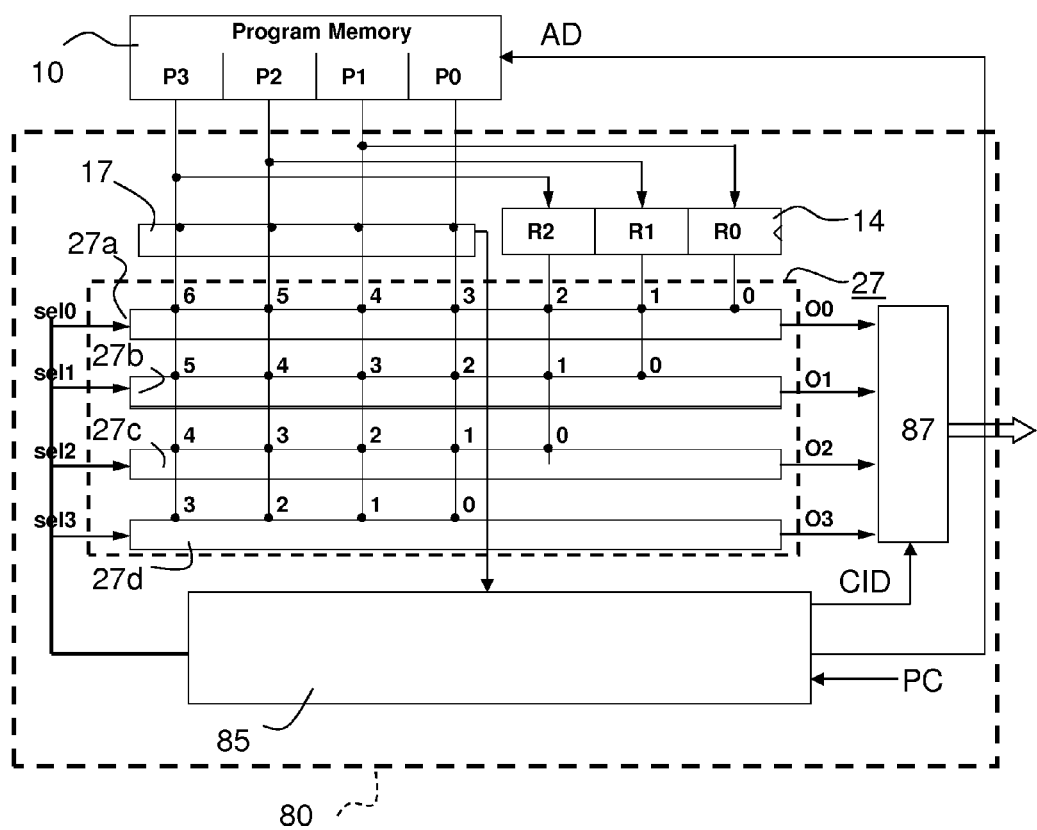
FIG. 8 shows a part of FIG. 7 in more detail.

A part of a first embodiment of the programmable processor of FIG. 7 including the instruction expander 80 is shown in more detail in FIG. 8.

In the first embodiment the program memory 10 provides program data for segment 0, segment 1, segment 2 and segment 3 at outputs P0, P1, P2 and P3 respectively. The storage element 14 delays a part of the program data provided by the program memory 10. In this case the storage element 14 provides delayed program data R2, R1, R0 respectively from outputs P3, P2 and P1 of the program memory 10. The multiplexing unit 27 controllably selects a part of the program data provided by the program memory 10 and the storage element 14. In the embodiment shown the multiplexer unit 27 comprises a plurality of multiplexer modules 27a, 27b, 27c, 27d. The multiplexer modules 27a, 27b, 27c, 27d respectively are controlled by selection signals sel0, sel1, sel2, sel3. Each of the multiplexer modules 27a, 27b, 27c, 27d is coupled to each of the outputs P0, P1, P2, P3 of the program memory 10. The first multiplexer module 27a is additionally coupled to outputs R0, R1, R2 of the storage element 14. The second multiplexer module 27b is additionally coupled to outputs R1 and R2 of the storage element 14. The third multiplexer module 27c is additionally coupled to output R2 of the storage element 14.

In the embodiment shown the compaction scheme identifier 17 is coupled directly to the program memory 10.

The inputs of the instruction expanding unit 87 are formed by one or more segments that contain a (compacted) instruction. This instruction is stored at some location in the program memory 10. A program memory word contains n (here 4) segments. Instructions can be one or more segments long and the segments of one instruction can be in different (but subsequent) program memory words. The multiplexer unit 27 allows the instruction expanding unit 87 to read directly (no register in between) from the program memory word. To support program memory word crossing instructions, the register 14 can store a previous memory word. As the maximum instruction length is n segments, only n−1 segments need to be stored.

Figure 9:
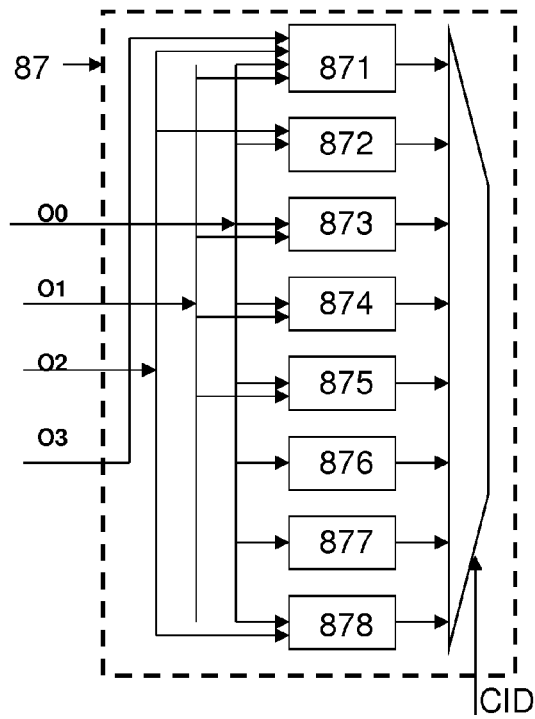
FIG. 9 shows a part of FIG. 8 in more detail.

As shown in FIG. 9, the outputs O0 . . . On−2 are connected to various instruction expanding modules 871-878 within the instruction expanding unit 87. O0 is used by all instruction expanding modules, O1 . . . On−2 are only connected if the view size requires it. On−1 is only used for uncompacted instructions.

Figure 10:
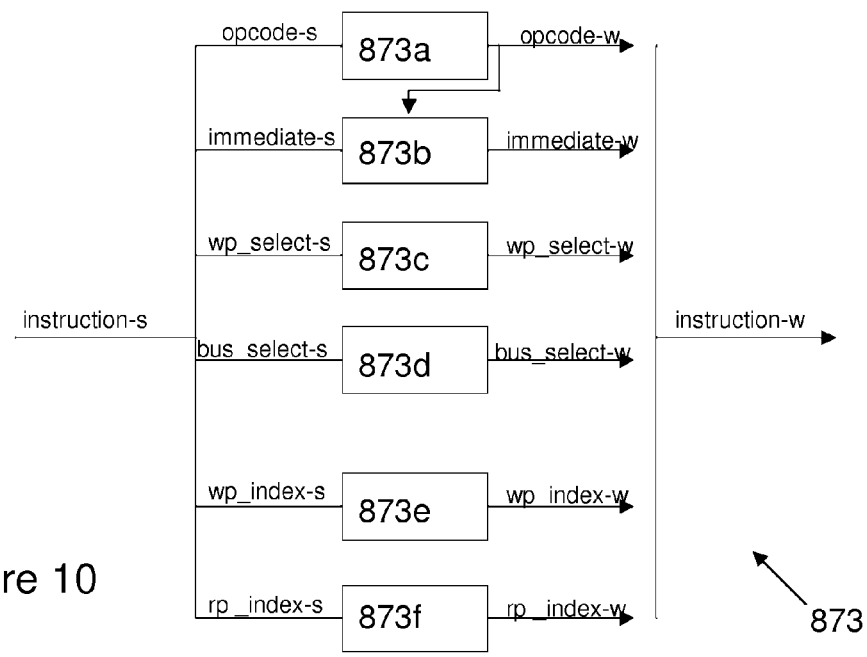
FIG. 10 shows a part of FIG. 9 in more detail.

Each of the instruction expanding modules 871-878 comprises a plurality of instruction decompaction segments 873a, . . . , 873f, as is shown for example for instruction expanding modules 873 in FIG. 10. Therein the decompaction module 873 comprises an opcode decompaction segment 873a for converting the compacted opcode opcode-s into the decompacted opcode opcode-w, an immediate decompaction segment 873b for converting the compacted immediate immediate-s into the decompacted immediate-s, a write port select decompaction segment 873c for converting the compacted write port select wp_select-s into the decompacted wp_select-w, a bus select decompaction segment 873d for decompacting the compacted bus-select "bus_select-s" into the decompacted "bus_select-w", a write port index decompaction segment 873e for decompacting the compacted write port index "wp_index-s" into the decompacted "wp_index-w", and a read port index decompaction segment 873f for decompacting the compacted read port index "rp_index-s" into the decompacted "rp_index-w".

The opcode decompaction segment 873a, the bus select decompaction segment 873d and the write port select decompaction segment 873e are for example implemented using a Look Up Table (LUT). The write port index decompaction segment 873e, and the read port index decompaction segment 873f may be implemented by a zero-extension segment that adds 0 or more '0' bits at the most significant side of the instruction field. The immediate decompaction segment 873b performs a sign extension or zero extension, depending on the opcode for the instruction.

The registers segments Rn−2 . . . R0 in the register 14 only store the lsb segments of an instruction that is divided over two memory words.

Because the size of instructions according to the smallest view equals the size of a segment, these instructions are always completely stored in one single program memory word. Hence, the multiplexer module 27d for the smallest view only has inputs that are directly coupled to the program memory 10 output. The multiplexers 27a, 27b, 27c for the views with instruction sizes of two or more segments have also input originating from the registers 14. This is due to the fact that these instructions can be divided over two program memory words. The number of register segment inputs of the multiplexer equals the number of instruction segments minus one.

The select signals sel 0, . . . , sel n for the multiplexer modules 27a, 27b, 27c, 27d, provided by the control facility 85 depend on their previous value and on the program memory enable signal of the previous instruction, i.e. whether the program memory output is new or already used previously. The length of an instruction determines which of the outputs O0, . . . On are actually used. An advantageous aspect of this embodiment is that the select signals can be pre-calculated in the cycle before the instruction is used. In this pre-calculation cycle, the previous values can be read from the register 14 and the program memory enable signal equals the actual signal that controls the program memory 10. If the current instruction appears to be a jump instruction, then the LSB's of the PC for the next instruction can be taken as the previous values of the selectors. The pre-calculation enables the use of a pipeline register for the sel 0, . . . sel n signals such that the timing of the instruction selection will improve.

Figure 11:
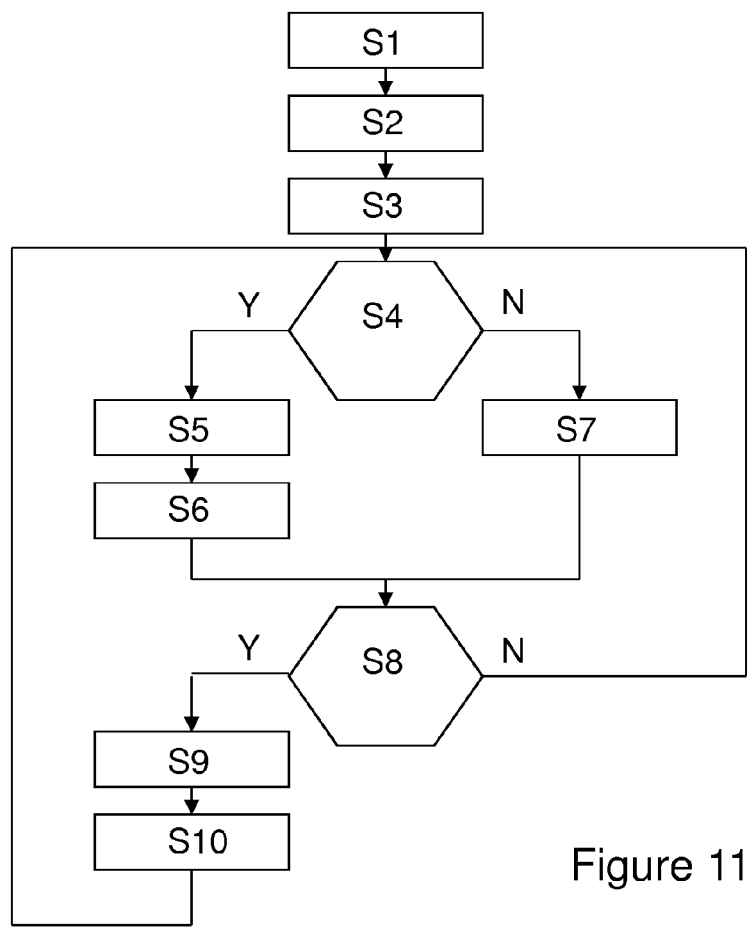
FIG. 11 shows a method for processing instructions in the processor of FIG. 7, FIG. 12 schematically shows a second embodiment of a programmable processor according to the present invention.

Instructions may be fetched from the program memory 10 as indicated in the flow chart of FIG. 11.

In a first step S1 the memory address AD is initialized, e.g. at the value 0. In a second step S2 a segment counter SG is initialized, in this case at 0. Then in a third step S3 an instruction start address BG is initialized. The instruction start address is composed of a memory address component AD and a segment component SG. In case that each memory word comprises n segments, then the instruction start address is computed as BG=n*AD+SG. In step S4 it is verified whether the value SG equals a maximum value, e.g. n−1. If that is the case the memory address AD is increased by 1 in step S5 and the segment number is reset to 0 in step S6. Otherwise the segment number is increased by 1 in step S7. After step S6 or step S7, whatever is applicable, the segment bit S is verified in step S8 to determine whether the segment starts with a new compacted instruction. If that is not the case instruction flow continues with step S4. Otherwise the length of the previous instruction is calculated in step S9 according to L=n*AD+SG−BG, and in step S10 the value of BG is calculated again according to BG=n*AD+SG. Then program flow continues with step S4. From the length L, and if necessary one or more additional view bits V, it is determined according to what view the instructions should are compacted and accordingly which view decoder is applicable.

Below it is described how sequencing according to the program in the above-mentioned table 3 takes place. Suppose instruction 4 includes a jump to instruction 9. The program starts at PC=0. Program memory address 0 is read and the compaction scheme identifier 17 identifies the start segment bits S in the four segments in the program memory word. From these 4 start segments bits, the compaction scheme identifier 17 determines that the word contains two instructions, the first instruction (0) starts at segment 0 and has a length of 1 segment, the second (1) starts at segment 1 and has a length of 3 or 4. Instruction 0 is mapped at view 1 because the view bit V for segment 0 is '0'. It can be decompacted using the view 1 instruction expanding unit and be executed subsequently. Instruction 1 needs to be stored in order to retrieve the next program memory word. Once the next program memory word of address 1 is available, the compaction scheme identifier 17 can see that segment 0 of this word contains a start segment bit S being "1". This means that instruction 1 has a length of 3 segments and can be decompacted, decoded and executed. The other segment start bits indicate a length of 3 for instruction 2. Instructions 2 and 3 need to be stored and the program memory word at address 2 can be retrieved. Once this word is received, instruction 2 can be decompacted, decoded and executed, instruction 4 and other information in the program memory word will be stored and the next program memory word is read. When instruction 4, a jump to instruction 9 is executed, the program counter is loaded with the start segment address of instruction 9. The program memory address is set at address 7 and the program memory word containing instruction 9 is read. In the next cycle, instruction 9, which appears to map on the full view can be executed.

In principle, this solution for identifying the code compaction scheme does not introduce extra stall cycles or extra branch delays. If a branch target is divided over two program memory words, a stall cycle is introduced due to the fact that two program memory words have to be read in order to retrieve the branch target instruction. But this is not related to the way the compaction scheme/view information is retrieved. The critical path for this solution is expected to be rather long because the sequence of determining the view information and start segment, selecting the correct segment for selecting the instruction and the decompaction all have to be executed within the time of one clock cycle. Potentially an extra pipeline stage needs to be inserted in this path in order to achieve the timing goals.

In another embodiment the view information is identified by the addition of a next view id (nxt_vw_ID) field to each (compacted) instruction. An example is given in Tables 4 and 5. This field is available at a predetermined location in every instruction, regardless of its length, for example in the lsb side of each instruction. The width of this field equals the $\log_2$ of the number of views. When sequencing through a program, the next view id of the previous instruction and the location of the current instruction (which is contained in the current PC) determine the location of the next instruction in the program memory. For a processor that has 8 views and a maximum compression factor of ⅛, it is sufficient if the next view id field has a width of 3 bits. Suppose that a program can be compacted with a factor of 3 (the average of the compression per instruction over all instructions), then the average number of instructions per program memory word amounts to 3. The total required number of bits for identifying the next view id then amounts to PMsize*3*3=9*PMsize. This is considerably less then the 16*PMsize for the solution using the start segment bit.

TABLE 4

| Instruction information | | | |
|---|---|---|---|
| instr | view | length | nxt_vw_ID |
| 0 | 1 | 1 | 3 |
| 1 | 3 | 3 | 4 |
| 2 | 4 | 3 | 2 |
| 3 | 2 | 2 | 5 |
| 4 | 5 | 1 | 0 |

TABLE 4-continued

Instruction information

| instr | view | length | nxt_vw_ID |
|---|---|---|---|
| 9 | 2 | 2 | 0 |
| 10 | 0 | 4 | 1 |

TABLE 5

Program memory map

| adr | segm 3 | segm 2 | segm 1 | segm 0 |
|---|---|---|---|---|
| 0 | 1 | 1 | 1  0 | 3 |
| 1 | 3  5 | 2 | 2  2 | 2 |
| 2 | ... | ... | 4  0 | 3 |
| ... | ... | ... | ... | ... |
| 7 | 9  0 | 8 | 8 | 8 |
| 9 | 10 | 10 | 10  0 | 9 |
| ... | ... | ... | ... | ... |

Figure 12:
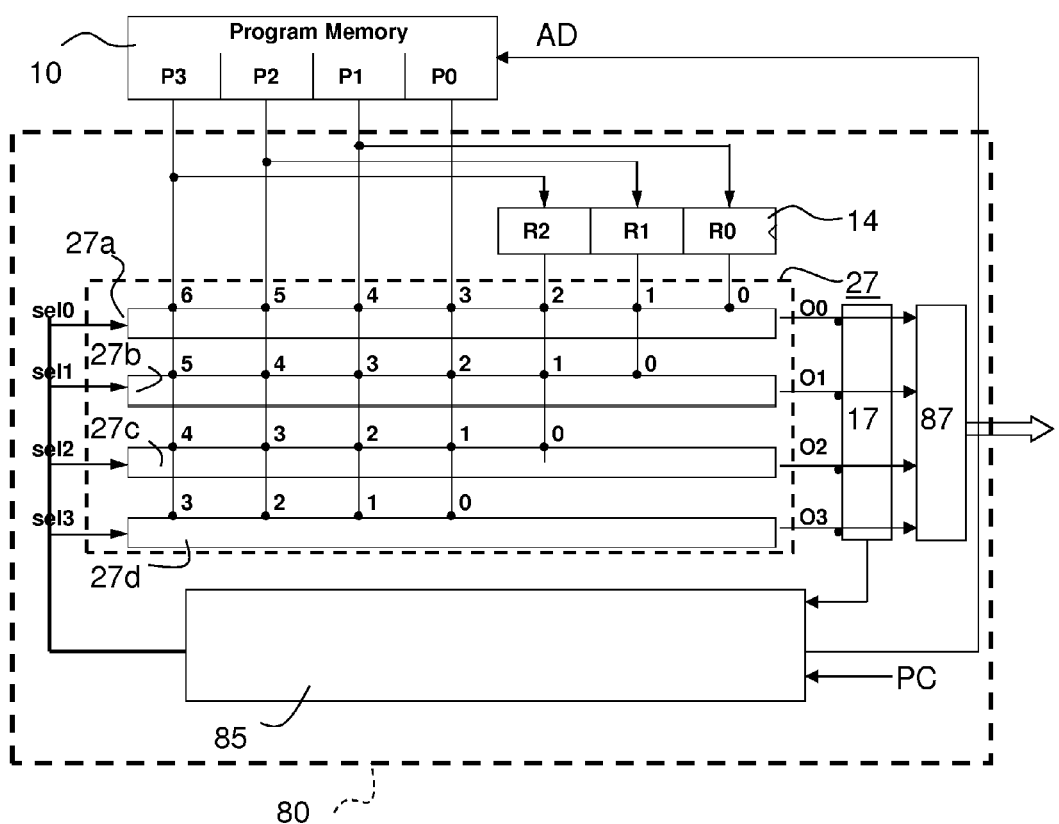

Table 4 shows a sequence of instructions in an exemplary program and table 5 show how the exemplary program is now stored in program memory, the compacted instructions now including the next view id field (nxt_vw_ID) as discussed above. The instruction table 4 contains besides the view and length column, an extra column that indicates the view_id of the next instruction. FIG. 12 shows a part of a second embodiment of a programmable processor according to the present invention that is arranged for processing compacted program that is stored in program memory as shown in the table 5 above.

This second embodiment differs from the first embodiment in that the compaction scheme identifier 17 is coupled to the output of the selection facility 27.

Figure 13:
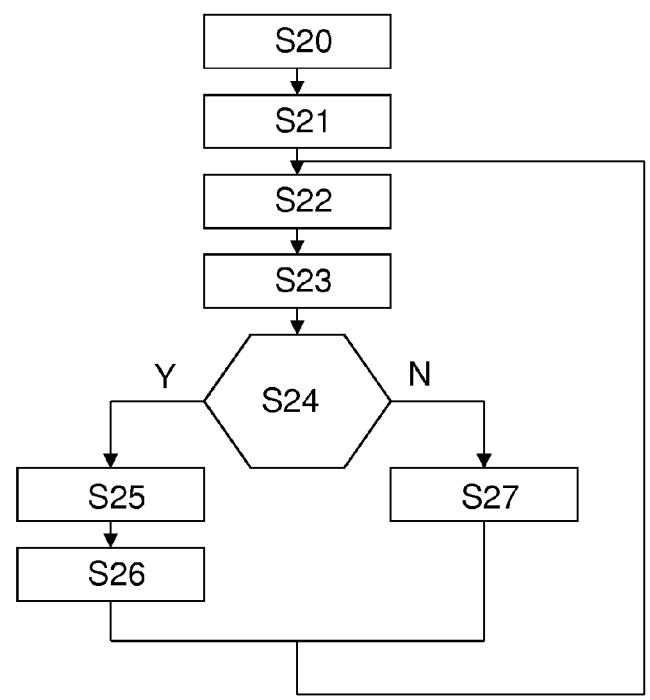
FIG. 13 shows a method for processing instructions in the processor of FIG. 12, FIG. 14 schematically shows a third embodiment of a programmable processor according to the present invention, FIG. 15 schematically shows a tool for generating a hardware description of a programmable processor according to the present invention.

Instructions may be fetched from the program memory 10 as indicated in the flow chart of FIG. 13.

In a first step S20 a memory word is read from the program memory 10. In a second step S21 the compaction scheme identifier 17 identifies the compaction scheme used for the next instruction. It is presumed that the compaction scheme of the first instruction is known and that it has a predetermined alignment in the memory word. In a third step S22 the length of the next instruction is read from a table and in step S23 the end address of the next instruction is calculated.

The end address is composed of a memory address component AD and a segment component SG. In step S24 it is determined whether the end address is in a next program word. If that is not the case the address counter AD is maintained at the current value and in step S27 the relevant segments are selected as the compacted data of the instruction to be decompacted and executed by the programmable processor. If it is determined in step S24 that the end address of the current compacted instruction is indeed in a next program word then the segments of the current compacted instruction in the current program word are stored in temporary storage facility, and the address AD is incremented.

The program counter consists of the segment address, the program memory address and the view id of the current instruction. At the start of the program execution, the PC points at instruction 0 and from the PC, the compaction scheme identifier 17 knows that the first instruction is a view 1 instruction, i.e. an instruction that is compacted according to a compaction scheme according to a first view. A hardware lookup table indicates that a view 1 instruction has a length of 1 segment. When the program memory word is available at the output, the next field id field of instruction 0 can be read resulting in the value 3. By indexing the length lookup table, it is determined by the compaction scheme identifier 17 that the next instruction, mapped to view 3, has a length of 3 segments. This information indicates that the reading of the program memory 10 can be hold for one clock cycle because instruction 1 is already completely available in the current program memory output. When expanding instruction 1, the program memory address can be set to 1 in order to read the program memory word containing the instructions 2 and part of 3. When instruction 2 is expanded and further processed, the control facility 85 will decide to read the next program memory address because the next view id field of instruction 2 indicates view 2 meaning a length 2 instruction. The start segment is at segment 3, which implies that this next instruction extends into the next program memory word. Instruction 4 contains a jump to instruction 9 that is located at program memory address 7, segment 3. The jump instruction delivers a PC that includes the view id 2 of instruction 9 in addition to the address of said instruction. With this information the control facility 85 determines that two program memory words need to be read first in order to decompact instruction 9 for further execution. The fact that branch target 9 is divided over two program memory words results in a stall cycle when jumping to a branch target.

In case of a conditional branch, the branch instruction comprises an indication of the view ID of the next instruction and additionally the branch address comprises the segment address, the program memory address and the view id of the instruction at the address that is conditionally branched to.

If desired, for example in a critical loop, this stall cycle may be avoided by placing the branch target at segment 0 of a program memory word such that it will never be divided over two memory words. Note that this is only necessary if the branch target instruction is divided over two program memory words. If the target does not start at segment 0, but has a length such that it still fits completely in that memory word, there is no need to replace it.

Placing a branch target at segment 0 removes the stall cycle but introduces another problem. A gap is created in the memory map. When the branch target is reached not by a jump but by sequencing from the previous instruction, this gap has to be passed. Five solutions are presented that may avoid this problem:

1. One value of the next view id field (nxt_vw_ID) is reserved for indicating a memory gap. If the next view field of an instruction indicates a memory gap, the next instruction should be read from segment 0 at the next program memory word. The view id of this instruction is indicated by the next view id field of the first segment of the gap.

2. An 'impossible' instruction value of the smallest view is inserted in the first segment of the gap. An "impossible" instruction value is an instruction value that cannot be generated by the compiler. An example is a NOP instruction with 'non-NOP' inputs. The programmable processor has an instruction selector that monitors the occurrence of this instruction. When detected, it selects segment 0 of the next program memory word instead of the segment with the impossible instruction. The view id of the branch target is identified by the next view id of the added impossible instruction.

3. An 'impossible' instruction value of the full view that cannot be generated by the compiler such as a NOP instruction with 'non-NOP' inputs is used as follows. The instruction fields are reshuffled such that the relevant instruction bits are at the lsb segment of a full instruction. The first segment of the gap is filled with this lsb segment of a full instruction. The next view id of this segment indicates the view id of the aligned branch target. The last instruction before the gap has a next view id resembling the full view id. Based on this full view id, the control facility 85 decides to load the next program memory word. When also the special instruction is detected, the control facility 85 decides to jump to the next aligned branch target. Table 7 illustrates the solution. After instruction 4, the program memory contains a gap of two segments. The first segment of the gap is filled with the lsb segment of the 'impossible' instruction (IMP), the second segment of the gap can be left with any value (X) as it is not read

TABLE 6

Instruction information

| instr | view | length | nxt_vw_ID |
|-------|------|--------|-----------|
| ... | ... | ... | ... |
| 2 | 4 | 3 | 2 |
| 3 | 2 | 2 | 5 |
| 4 | 5 | 1 | 0 |
| 5 | 4 | 3 | 2 |
| 6 | 2 | 2 | 4 |
| 7 | 4 | 3 | 1 |
| ... | ... | ... | ... |

TABLE 7

Program memory

| addr | segm 3 | | segm 2 | | segm 1 | | segm 0 | |
|------|--------|--|--------|--|--------|--|--------|--|
| ... | ... | | ... | | ... | | ... | |
| 10 | 3 | 5 | | 2 | | 2 | 2 | 2 |
| 11 | X | | IMP | 4 | 4 | 0 | | 3 |
| 12 | 6 | 4 | | 5 | | 5 | 5 | 2 |
| 13 | | 7 | | 7 | 7 | 1 | | 6 |
| ... | ... | | ... | | ... | | ... | |
| ... | ... | | ... | | ... | | ... | |

4. All critical branch targets are fitted in the smallest view. This can be realized by starting the compression process with these critical branch targets and fill the tables with their instruction field values.

5. An extra bit is reserved per program memory word. If this bit is '1', the msb segment of the program memory word indicates the start point of the gap. The last instruction before the gap includes the view id of the aligned branch target.

The presented 5 solutions may impact the timing of the executed program, the complexity of the linker, the compaction factor of the program and the complexity and the (critical) timing path of the hardware as is illustrated in table 8. The skilled person may select one of these solutions depending on the weight given to these factors. The impact on these factors is schematically indicated in the following table. The first column indicates the solution as presented above, the second column indicates the feasibility of the solution. Therein the symbols "−", "0", and "+" respectively indicate probably not feasible, not always feasible and feasible. The third column indicates the impact on the compaction factor. A "−" indicates that the compaction factor is reduced. A "o" indicates that the measure has no substantial effect on the compaction factor. The last column indicates the impact on the hardware complexity in terms of the number of gates required for implementation, ranging from "−" to indicate a relatively complex hardware implementation to "++" indicating a hardware implementation of a relatively low complexity. Generally speaking a more complex hardware implementation will imply a longer combinatorial paths and therewith a slower timing.

TABLE 8

Comparison between the solutions presented

| solution | feasibility | compaction | HW |
|----------|-------------|------------|-----|
| 1 | + | − | − |
| 2 | ○ | − | − |
| 3 | + | ○ | ○ |
| 4 | + | − | ++ |
| 5 | + | − | ○ |

Solution 1 is an elegant solution but the cost of a field id will decrease the compaction factor. Solution 2 is not always feasible. The special 'impossible' instruction may not be available in the smallest view. Besides that, the timing path to the program memory enable signal is rather long. Solution 3 does not have these problems, it is therefore preferred. Nevertheless, it has the drawback that the instruction fields need to be reshuffled. Solution 4 potentially decreases the compaction factor because the smallest view has non-optimal table entries. Solution 5 results in a small compaction factor reduction, but it has no advantages over solution 3.

In view of the above, solution 3, using a special instruction in the full view is preferred.

Aligning all branch targets would drastically reduce the compaction factor for a program. To avoid this, only time-critical branch targets should be placed at an aligned boundary. In general time critical branch targets are part of time-critical loops. The user or the scheduler has to indicate where these are located. The assembler has to include this information in the (ELF) object file such that the compaction tool 190 (FIG. 6) can see which instructions should be placed at an aligned address.

The following table 9 shows an example of a program execution for the architecture of FIG. 12. In this example, the program memory width equals 4 segments. The first column (nr) indicates which instruction is decompacted. The second column (partial) contains a '1' if the msb segment of the program memory 10 is part of an instruction that is continued in the next program memory word. The columns P3 down to P0 indicate the output of the program memory 10. Each column represents a segment. The number indicates the instruction number. Compacted instruction 0 appears to have a width of 1 segment, instruction 1 is 2 segments wide, . . . etc. The columns R2, R1 and R0 represent the number of the instructions (or segment thereof) that is present at the outputs of the registers. The columns M and R indicate whether the address AD for the program memory is incremented and/or whether the registers need to be updated. The output segment columns O3 . . . O0 indicate from which memory segment P0, . . . , P3 or from which register segment R0, . . . , R2 the instruction segments are read from and the register inputs R2, R1 and R0 indicate from which part of the program memory 10 relevant data is stored in the registers 14. Note that the registers segments R0, R1, R2 always get their data from the same program memory segment P1, P2, P3 respectively. The column MS indicates the select value for the multiplexers 27a, . . . 27d. It is attractive that all multiplexers are controlled by this select value.

The example shows that registers R0, R1 and R2 are only written when necessary. The columns O3, . . . O0 show that the multiplexers always select a value, even if this value is not used. Only the reverse marked entries are actually used by the instruction expanding unit 87.

The second column contains a '1' if the P3 segment of the current PM word is part of an instruction that continues in the next PM word.

TABLE 9

| Instruction | | Program Memory | | | | Registers | | | Enable | | Output Segments | | | | | Register Inputs | | |
|---|---|---|---|---|---|---|---|---|---|---|---|---|---|---|---|---|---|---|---|
| nr | partial | AD | P3 | P2 | P1 | P0 | R2 | R1 | R0 | M | R | O3 | O2 | O1 | O0 | MS | R2 | R1 | R0 |
| 0  | 1 | 0 | 2  | 1  | 1  | 0  |    |    |   | 0 | 0 | P3 | P2 | P1 | P0 | 3 |    |    |    |
| 1  | 1 | 0 | 2  | 1  | 1  | 0  |    |    |   | 1 | 1 |    | P3 | P2 | P1 | 4 | P3 |    |    |
| 2  | 1 | 1 | 3  | 3  | 2  | 2  | 2  |    |   | 1 | 1 | P2 | P1 | P0 | R2 | 2 | P3 | P2 |    |
| 3  | 1 | 2 | 4  | 4  | 3  | 3  | 3  | 3  |   | 1 | 1 | P1 | P0 | R2 | R1 | 1 | P3 | P2 |    |
| 4  | 1 | 3 | 5  | 5  | 5  | 4  | 4  | 4  |   | 1 | 1 | P1 | P0 | R2 | R1 | 1 | P3 | P2 | P1 |
| 5  | 0 | 4 | 8  | 7  | 6  | 5  | 5  | 5  | 5 | 0 | 0 | P0 | R2 | R1 | R0 | 0 |    |    |    |
| 6  | 0 | 4 | 8  | 7  | 6  | 5  |    |    |   | 0 | 0 |    | P3 | P2 | P1 | 4 |    |    |    |
| 7  | 0 | 4 | 8  | 7  | 6  | 5  |    |    |   | 0 | 0 |    |    | P3 | P2 | 5 |    |    |    |
| 8  | 0 | 4 | 8  | 7  | 6  | 5  |    |    |   | 1 | 0 |    |    |    | P3 | 6 |    |    |    |
| 9  | 0 | 5 | 11 | 11 | 10 | 9  |    |    |   | 0 | 0 | P3 | P2 | P1 | P0 | 3 |    |    |    |
| 10 | 0 | 5 | 11 | 11 | 10 | 9  |    |    |   | 0 | 0 |    | P3 | P2 | P1 | 4 |    |    |    |
| 11 | 0 | 5 | 11 | 11 | 10 | 9  |    |    |   | 1 | 0 |    |    | P3 | P2 | 5 |    |    |    |
| 12 | 0 | 6 | 12 | 12 | 12 | 12 |    |    |   | 1 | 0 | P3 | P2 | P1 | P0 | 3 |    |    |    |
| 13 | 1 | 7 | 14 | 13 | 13 | 13 |    |    |   | 1 | 1 | P3 | P2 | P1 | P0 | 3 | P3 |    |    |
| 14 | 1 | 8 | 15 | 14 | 14 | 14 | 14 |    |   | 1 | 1 | P2 | P1 | P0 | R2 | 2 | P3 |    |    |
| 15 | 0 | 9 | 16 | 16 | 15 | 15 | 15 |    |   | 0 | 0 | P2 | P1 | P0 | R2 | 2 |    |    |    |
| 16 | 0 | 9 | 16 | 16 | 15 | 15 |    |    |   | 1 | 0 |    |    | P3 | P2 | 5 |    |    |    |
|    |   | ... |    |    |    |    |    |    |   |   |   |    |    |    |    |   |    |    |    |
| 20 | 1 | ... | 20 | 20 | 0  | 0  |    |    |   | 1 | 1 |    | P3 | P2 | 5 | P3 | P2 |    |    |
| 21 | 0 | ... | 22 | 21 | 21 | 20 | 20 | 20 |   | 0 | 0 | P1 | P0 | R2 | R1 | 1 |    |    |    |
| 22 | 0 | ... | 22 | 21 | 21 | 20 |    |    |   | 0 | 0 |    | P3 | P2 | P1 | 4 |    |    |    |
| 23 | 0 | ... | 22 | 21 | 21 | 20 |    |    |   | 1 | 0 |    |    |    | P3 | 6 |    |    |    |

Instruction 20 is a jump target that is divided over two memory words. This leads to a stall cycle.

Figure 14:
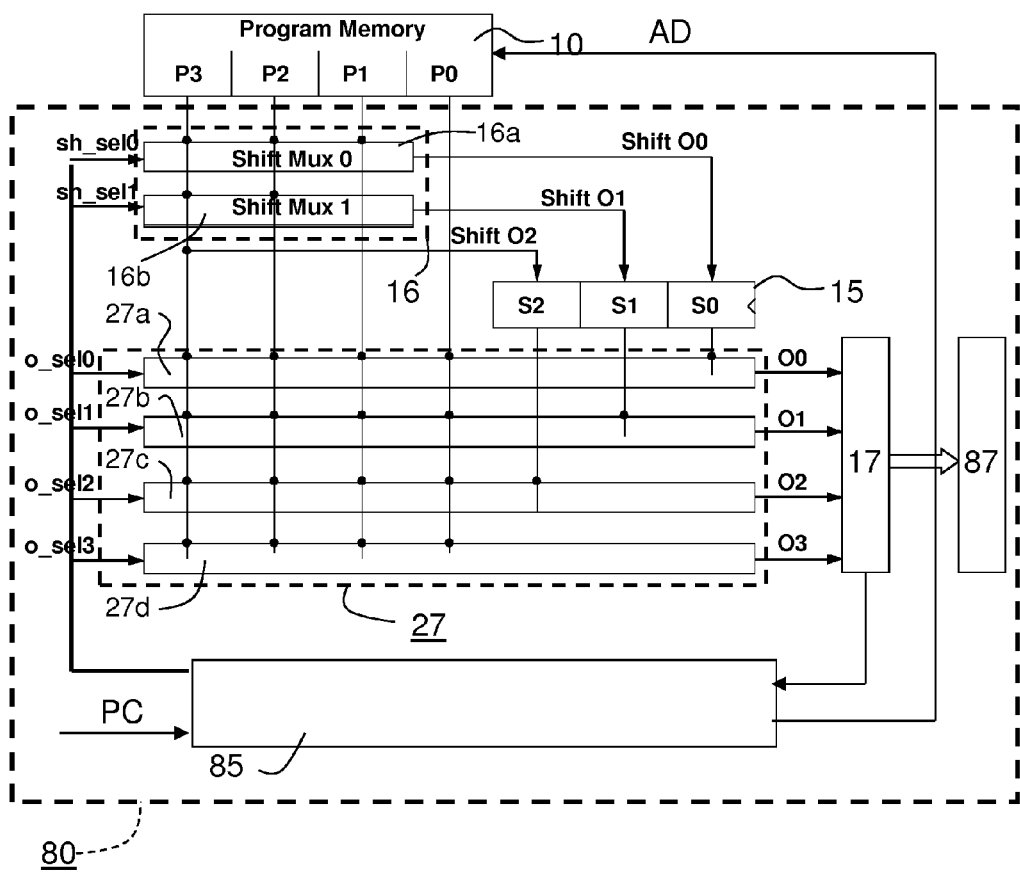

FIG. 14 shows a second embodiment of a programmable processor according to the present invention. This embodiment differs from the first embodiment in that the register 14 is replaced by a shift register 15 that is coupled via an input multiplexer unit 16 to the program memory 10. In the embodiment shown the input multiplexer unit 16 comprises two input multiplexer modules 16a, 16b. The shift registers 15 are also denoted as S2, S1 and S0 in the figure. The inputs of the shift registers 15 are connected to the two input multiplexers 16a, 16b. One input of the shift registers 15 is formed by the output of segment P3 of the program memory 10. The other input is connected to a shift register, also starting at the lsb segment. In order to prevent extra branch delays, branch targets should be placed in a single program memory word. When a branch target is available at the output of the program memory 10, it is fed through the output multiplexer unit 27 and expanded by the appropriate instruction expansion module in the instruction expansion unit 87. Then the remainder of the program memory word (excluding the just decoded instruction) is shifted into the shift registers (S2, S1 and S0) together denoted as 15 such that the next instruction starts at the lsb (ls segment) of the shift register. The next instruction can be read from the register 15, starting from the lsb side. If the instruction is only partly available in the shift register 15, the remaining part is read from the output of the program memory 10. The shift multiplexers 16a, 16b can be reused for selecting the appropriate segment of the program memory.

The instruction fetching sequence in this embodiment is substantially the same as in the first embodiment of the programmable processor. The selector signals for the output multiplexers can be pipelined in order to reduce the timing path.

The following table 10 is included for illustration of the operation of the device.

The number nr in the first column is equal to the program counter value PC.

The third column indicates the memory address AD of the program memory that is addressed.

P0, P1, P2, P3 indicate the instruction id of respective segments of the addressed memory word.

S0, S1, S2 indicate the segments of the program memory 10 from which instruction data is fetched.

M indicates whether the memory address AD is incremented the next cycle.

R indicates whether the register 15 is enabled to accept data from the program memory 10.

O0, ..., O3 respectively indicates which of the program memory segments P0,P1,P2, P3 and register segments S0, S1, S2 is visible at the outputs of the multiplexer modules 27a, ..., 27d.

In the example described with respect to the table below, the following is observed.

In the first line of this table the instruction expander 80 receives the program counter with value 0 and assumes this value as the program memory address. At said memory address the program memory comprises in a first segment the compacted data for a first instruction word (0), in a second and a third segment the compacted data for a second instruction word (1) and in a fourth segment part of the compacted data for a third instruction word (2). The one segment P0 comprising the compacted first instruction word is selected and provided via output O0 to the instruction expanding unit 87. As in this case the addressed memory word comprises a complete compacted second instruction in segments P1, P2, an increase in program counter PC is not followed by an increase in program memory address AD. Instead, the two segments P1, P2 comprising the second instruction (1) are selected and provided at outputs O0 and O1 respectively to the instruction expanding unit 87. In the same cycle the output segment P3 is read in segment S0 of register 15. As memory address 0 only comprises a part of the compacted next instruction (2) control signal M now allows the memory address AD to increase in the next cycle. Accordingly in the next cycle the memory address 1 is addressed and the instruction data for instruction 2 is now provided at the outputs O0, O1, O2, O3, by selection of register segment S0, and program memory segments P0, P1, P2 respectively. In subsequent cycles each time one or more segments of compacted instruction data are retrieved and expanded if necessary.

In a programmable processor according to the present invention decompaction of instructions or instruction fields is typically performed by indexing a programmable table, herein also denoted as a decompaction table. Write and read facilities are provided for writing and reading the decompac-

TABLE 10

| Instruction | | Program Memory | | | | | Registers | | | Enable | | Output Segments | | | | MS | Register Inputs | | |
|---|---|---|---|---|---|---|---|---|---|---|---|---|---|---|---|---|---|---|---|
| nr | partial | AD | P3 | P2 | P1 | P0 | S2 | S1 | S0 | M | R | O3 | O2 | O1 | O0 | MS | S2 | S1 | S0 |
| 0 | 1 | 0 | 2 | 1 | 1 | 0 | | | | 0 | 0 | | | | P0 | | | | |
| 1 | 1 | 0 | 2 | 1 | 1 | 0 | | | | 1 | 1 | | | P2 | P1 | | | | P3 |
| 2 | 1 | 1 | 3 | 2 | 2 | 2 | | | 2 | 1 | 1 | P2 | P1 | P0 | S0 | | | | P3 |
| 3 | 1 | 2 | 4 | 4 | 3 | 3 | | | 3 | 1 | 1 | | P1 | P0 | S0 | | | P3 | P2 |
| 4 | 1 | 3 | 5 | 5 | 5 | 4 | | 4 | 4 | 1 | 1 | | P0 | S1 | S0 | | P3 | P2 | P1 |
| 5 | 0 | 4 | 7 | 7 | 6 | 5 | 5 | 5 | 5 | 0 | 0 | P0 | S2 | S1 | S0 | | | | |
| 6 | 0 | 4 | 7 | 7 | 6 | 5 | | | | 0 | 0 | | | | P1 | | | | |
| 7 | 0 | 4 | 7 | 7 | 6 | 5 | | | | 1 | 0 | | | P3 | P2 | | | | |
| 8 | 1 | 5 | 9 | 8 | 8 | 8 | | | | 1 | 1 | | P2 | P1 | P0 | | | | P3 |
| 9 | 0 | 6 | 11 | 10 | 10 | 9 | | | 9 | 0 | 0 | | | P0 | S0 | | | | |
| 10 | 0 | 6 | 11 | 10 | 10 | 9 | | | | 0 | 0 | | | P2 | P1 | | | | |
| 11 | 0 | 6 | 11 | 10 | 10 | 9 | | | | 1 | 0 | | | | P3 | | | | |
| | | ... | | | | | | | | | | | | | | | | | |
| 20 | 1 | ... | 20 | 20 | 20 | 0 | 0 | 0 | 0 | 1 | 1 | 0 | 0 | 0 | 0 | | | | P3 |
| 20 | 1 | ... | 23 | 21 | 21 | 20 | 20 | 20 | 20 | 0 | 0 | P0 | S2 | S1 | S0 | | | | |
| 21 | 1 | ... | 23 | 21 | 21 | 20 | | | | 0 | 0 | | | P2 | P1 | | | | |
| 22 | 1 | ... | 23 | 21 | 21 | 20 | | | | 1 | 1 | | | | P3 | | | | P3 |
| 23 | 1 | ... | 24 | 18 | 18 | 23 | | | 23 | 1 | 0 | | | P0 | S0 | | | | |
| 24 | 0 | ... | 26 | 26 | 25 | 25 | | | | 0 | 0 | | P1 | P0 | P3 | | | | |
| 25 | 0 | ... | 26 | 26 | 25 | 25 | | | | 0 | 0 | | | P1 | P0 | | | | |
| 26 | 0 | ... | 26 | 26 | 25 | 25 | | | | 1 | 0 | | | P3 | P2 | | | | |
| 34 | 1 | ... | 0 | 0 | 0 | 0 | 0 | 0 | 0 | 0 | 1 | | | | P3 | | | | P3 |

For the first embodiment (shown in FIG. 12), the start segment for the next instruction can be calculated from the start segment of the current instruction and the length of the current instruction. From this start segment, the one-hot word for sel0 can be calculated. The LSB part of sel0 is copied to sel1, ... seln. Note that the output segments O0 ... On always contain data. The instruction expanding unit 87 has to take into account that depending on the instruction length, only the lsb segments have to be read.

For the second embodiment (shown in FIG. 14), the calculation of the start segment is equal. The conversion from start segment to one-hot selector for the o_sel0 is slightly different, in that the one-hot word is smaller but the signals for o_sel1 ... o_seln are not merely shifted versions. The number of segments available in S0 ... Sn influences the relation between the o_sel signals. The embodiment shown in FIG. 12 uses a 2n−1 bit one-hot word for controlling the multiplexer unit, whereas the embodiment of FIG. 14 uses a n+1 bit one-hot word. For the second embodiment however, the sh_sel signals have to be generated too. These do not have to be registered as the timing path from program memory 10 to input shift registers Sn ... S0 is short enough. The select signal sh_sel0 ... sh_seln can be generated from the next start segment.

Figure 15:
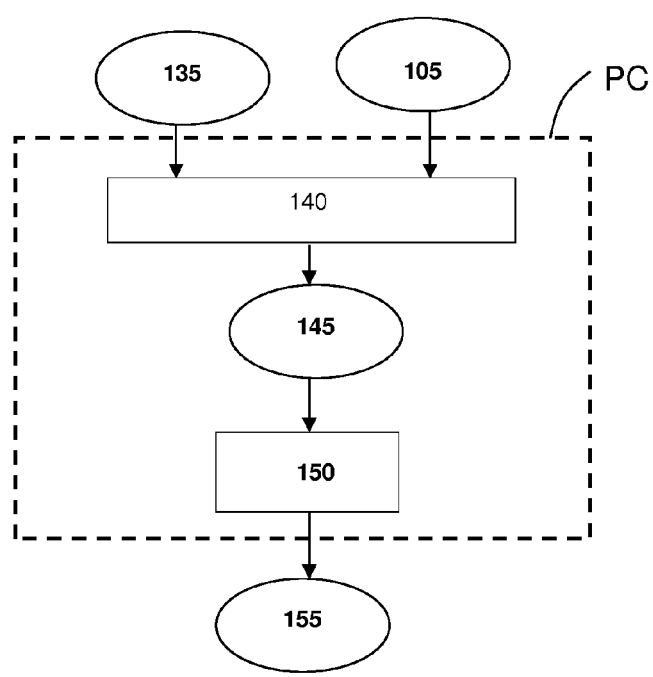

Specifications for a programmable processor according to the present invention may be automatically generated using a hardware generation tool. FIG. 15 shows such a tool PC. Therein the view definition file 135 and the processor description file 105 of a conventional processor, e.g. the processor shown in FIG. 1 are provided to a second APEX module 140. This second APEX module 140 gathers the information from the processor description file 105 and the view definition file 135 and provides an API 145 for extracting the parameters defined in the description of a processor. This API 145 is used by the hardware building blocks libraries 150 that generate the specification 155.

tion tables. In an embodiment the registers for the decompaction tables are only clocked when the entries are written. Usually, this occurs once after the processor has been powered on. Hence clock gating for the decompaction table registers results in a significant reduction in power use.

In an embodiment, at least one decompaction table is used for decompacting instructions according to a plurality of views. This would not require multi read ports on decompaction tables because instruction expansion modules for mutually different compaction schemes do not have to be executed in parallel.

A decompaction table will always include the NOP value for an instruction field. It makes sense to reserve address 0 of each table for the NOP code and make this a fixed entry instead of implementing this entry by a register.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. Method carried out by an apparatus of generating respective instruction compaction schemes for subsets of instructions to be processed by a programmable processor, comprising:

a) receiving, in an instruction memory, at least one input code sample representative for software to be executed on the programmable processor, the input code comprising a plurality of instructions defining a first set of instructions;
b) initializing a set of removed instructions as empty;
c) determining the most compact representation of the first set of instructions by applying a compression factor to obtain a size of a processor view of the first set of instructions, wherein the size of the view corresponds to a number of instruction bits;
d) comparing the size of the view of said most compact representation with a goal size of a view, the goal size serving as a threshold value;
e) carrying out operations e1 to e3 if the size is larger than said threshold value;
e1) determining which instruction of the first set of instructions has a highest coding cost;
e2) removing said instruction having the highest coding cost from the first set of instructions; and
e3) adding said instruction to the set of removed instructions in a second instruction memory; and
f) repeating operations b-f using a different compression factor, wherein the first set of instructions is formed by the set of removed instructions.

2. Method according to claim 1, comprising the operation of requesting a number of instruction compaction schemes and the compression per instruction compaction scheme.

3. Method according to claim 1 comprising the operation of iterating over a plurality of instruction compaction schemes and determining the amount of compression achieved for each instruction compaction scheme.

4. Method according to claim 1, wherein the instructions comprise a plurality of instruction fields that are individually compacted.

5. Method according to claim 4, wherein the instruction fields that are individually compacted comprise at least an opcode, a field indicative for an index to a write-port, and a field indicative for an index to a read port.

6. Method according to claim 1, wherein the instruction compaction schemes for the different subsets have a mutually different codeword width, at least one of the subsets having a minimum codeword width.

7. Method according to claim 6, wherein the size of the codewords of the compaction scheme for each subset is an integer number times the minimum codeword width, the integer number being greater or equal than 1.

8. Method according to claim 1, wherein mutually different subsets are compacted in mutually different ways.

9. Method according to claim 1, wherein at least one of the subsets is compacted as a variable length code.

10. Method according to claim 1, comprising:
receiving a program comprising a plurality of instructions;
for each instruction determining the corresponding instruction compaction as determined in operations a-f;
compressing the instruction according to said instruction compaction; and
providing the compacted instructions.

11. Method according to claim 10, comprising the operation of providing the compacted instructions together with at least one indicator for indicating the type of compaction used.

12. Method according to claim 10, wherein the compacted instructions are stored in words comprising a plurality of segments, and wherein each segment comprises at least an indicator that indicates whether said segment is the first segment of a compacted instruction.

13. Method according to claim 10, wherein the compacted instructions are stored in words comprising a plurality of segments, where each compacted instruction comprises an indicator at a predetermined location within said compacted instruction, the indicator indicating the type of compaction used for the next compacted instruction.

14. Method according to claim 1, further comprising the operations of:
receiving a specification for a programmable processor; and
determining a hardware specification for an instruction decompactor using said specification and the generated respective instruction compaction schemes.

15. Non-transitory record carrier comprising a program for causing an apparatus to carry out the method of generating respective instruction compaction schemes for subsets of instructions to be processed by a programmable processor, comprising:
a) receiving at least one input code sample representative for software to be executed on the programmable processor, the input code comprising a plurality of instructions defining a first set of instructions;
b) initializing a set of removed instructions as empty;
c) determining the most compact representation of the first set of instructions by applying a compression factor to obtain a size of a processor view of the first set of instructions, wherein the size of the view corresponds to a number of instruction bits;
d) comparing the size of the view of said most compact representation with a goal size of a view, the goal size serving as a threshold value;
e) carrying out operations e1 to e3 if the size is larger than said threshold value;
e1) determining which instruction of the first set of instructions has a highest coding cost;
e2) removing said instruction having the highest coding cost from the first set of instructions; and
e3) adding said instruction to the set of removed instructions; and
repeating operations b-f using a different compression factor, wherein the first set of instructions is formed by the set of removed instructions.

16. A programmable processor comprising
a program memory comprising a sequence of instructions that are stored as compacted instruction data, the compacted instruction data at least comprising first instructions compacted according to a first instruction compaction scheme as first code words of N memory word segments and second instructions compacted according to a second instruction compression scheme as second code words of M memory word segments,
an instruction decoder;
at least one register file;
at least one issue slot coupled to the register file; and
an instruction expander comprising:
a compaction scheme identifier for identifying the instruction compaction scheme for compacted instruction data fetched from the program memory;
an input for receiving a program counter;
a storage facility for temporarily storing at least a segment of a program memory word;
a selection facility for selecting compacted instruction data from the program memory (10) and the storage facility;
an instruction expanding unit for expanding the selected compacted instruction to expanded instructions of size K; and
a control facility for generating an address for the program memory in response to the program counter, and for controlling the selection facility, wherein K, N and M are integers greater or equal than 1, the integers N, M being not greater than K, and wherein at least one of N and M is less than K.

17. A programmable processor according to claim 16, wherein the storage facility is a register, and wherein the selection facility comprises a plurality of multiplexing modules, wherein each multiplexing module selects one or zero segments of compacted instruction data.

* * * * *